(12) United States Patent
Hashimoto et al.

(10) Patent No.: US 11,099,045 B2
(45) Date of Patent: Aug. 24, 2021

(54) GAS FLOW METER FOR GRAPHICALLY DISPLAYING AND INDICATING A HISTORY OF INTEGRATED FLOW AMOUNT

(71) Applicant: Keyence Corporation, Osaka (JP)

(72) Inventors: Yohei Hashimoto, Osaka (JP); Kentaro Yamazaki, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 149 days.

(21) Appl. No.: 16/574,157

(22) Filed: Sep. 18, 2019

(65) Prior Publication Data

US 2020/0209026 A1    Jul. 2, 2020

(30) Foreign Application Priority Data

Dec. 28, 2018  (JP) .............................. JP2018-248706

(51) Int. Cl.
| | |
|---|---|
| *G01F 15/06* | (2006.01) |
| *G01F 15/07* | (2006.01) |
| *G01F 1/66* | (2006.01) |
| *G01F 15/075* | (2006.01) |

(52) U.S. Cl.
CPC .......... *G01F 15/075* (2013.01); *G01F 15/068* (2013.01); *G01F 1/662* (2013.01)

(58) Field of Classification Search
None
See application file for complete search history.

(56) References Cited

U.S. PATENT DOCUMENTS

| | | | | |
|---|---|---|---|---|
| 2007/0107535 | A1* | 5/2007 | Mori ...................... | G01F 15/00 73/861.28 |
| 2013/0124113 | A1* | 5/2013 | van Dal .................. | G06F 19/00 702/45 |
| 2018/0144418 | A1* | 5/2018 | Ravid .................... | G01D 4/004 |
| 2019/0011303 | A1 | 1/2019 | Hashimoto et al. | |

FOREIGN PATENT DOCUMENTS

| | | |
|---|---|---|
| JP | 2001-296199 A | 10/2001 |
| JP | 2002-267509 A | 9/2002 |
| JP | 2004-347352 A | 12/2004 |
| JP | 2005-315712 A | 11/2005 |

OTHER PUBLICATIONS

U.S. Appl. No. 16/574,161, filed Sep. 18, 2019 (119 pages).

* cited by examiner

*Primary Examiner* — Harshad R Patel

(74) *Attorney, Agent, or Firm* — Kilyk & Bowersox, P.L.L.C.

(57) ABSTRACT

In a temporally continued plurality of day-and-time sections, history data included in the past day-and-time section is graphically displayed on the basis of the integrated flow amount data stored in the storage unit, as an integrated flow amount in each day-and-time section. In the day-and-time section including the current day-and-time, the integrated flow amount in the day-and-time section based on the current integrated flow amount data is successively updated and graphically displayed.

14 Claims, 22 Drawing Sheets

FIG. 7

| TIME INFORMATION | | TOTAL INTEGRATED FLOW AMOUNT | FOR EVERY HOUR | FOR EVERY DAY |
|---|---|---|---|---|
| YEAR-MONTH-DAY | HOUR-MINUTE-SECOND | | USE AMOUNT FOR EVERY SECTION | USE AMOUNT FOR EVERY SECTION |
| 2020/12/30 | 22:00:00 | 9,998,540 | 451 | |
| 2020/12/30 | 23:00:00 | 9,998,991 | 165 | |
| 2020/12/31 | 0:00:00 | 9,999,156 | 156 | |
| 2020/12/31 | 1:00:00 | 9,999,312 | 445 | |
| 2020/12/31 | 2:00:00 | 9,999,757 | 460 | 14,268 |
| 2020/12/31 | 3:00:00 | 217 | 456 | |
| ... | ... | ... | ... | |
| 2020/12/31 | 22:00:00 | 13,273 | 465 | |
| 2020/12/31 | 23:00:00 | 13,738 | 151 | |
| 2021/1/1 | 0:00:00 | 13,424 | 156 | |
| 2021/1/1 | 1:00:00 | 13,580 | 456 | |
| 2021/1/1 | 2:00:00 | 13,880 | | |

NEWEST SECTION

EXAMPLE: ○ SCREEN SETTING  ⇐ ⇒  DATE CHANGE
(MONTH CHANGE, YEAR CHANGE)

GAS FLOW METER FOR GRAPHICALLY DISPLAYING AND INDICATING A HISTORY OF INTEGRATED FLOW AMOUNT

CROSS-REFERENCE TO RELATED APPLICATIONS

The present application claims foreign priority based on Japanese Patent Application No. 2018-248706, filed Dec. 28, 2018, the contents of which is incorporated herein by reference.

BACKGROUND OF THE INVENTION

1. Field of the Invention

The present invention relates to a gas flow meter.

2. Description of Related Art

JP-A-2001-296199 discloses a gas leak detector that belongs to the technical field of measures against urban gas flowing through a pipe, and the gas leak detector is interposed between a flow-in side pipe and a flow-out side pipe. The gas leak detector is provided with a display unit, and an instantaneous flow rate, in other words, a current value is displayed on this display unit. This instantaneous flow rate is updated all the time, so that a minute leakage can be detected on the basis of the displayed instantaneous flow rate.

JP-A-2002-267509 discloses a fluid flow meter that is mounted to a pipe. This fluid flow meter is provided with a display unit including a 3-digit-7-segment LED, and a numerical value of an instantaneous flow rate and a threshold, and an integrated flow amount for every predetermined time can be switched and displayed on the display unit.

JP-A-2004-347352 discloses an ultrasonic vortex flow meter that is provided with a display unit. In this fluid flow meter, a main body and the display unit can be separated from each other, and an instantaneous flow rate and an integrated value generated in the main body are switched and displayed on a display device of the display unit. Herein, the integrated value indicates an integrated flow amount value from a start time point of the measurement to the current time.

JP-A-2005-315712 discloses a thermal gas flow meter. This flowmeter includes a head unit and an amplifier unit, and these are separated from each other. The amplifier unit includes a micro processor, and no micro processor is provided to the head unit. The head unit is provided with a display unit, and a pattern display is performed in accordance with a detected flow amount using this display unit.

There are many devices that use the compression air as a drive source in a factory. The compression air is supplied to the device from a compressor through a pipe that is laid in the factory, and in that case, electric power energy corresponded to the compression air to be generated is applied to the compressor.

In order to appropriately manage the energy that is used in the factory, management of the compression air to be used is also one of important elements.

In order to quantitatively manage the compression air to be used, it is required to dispose a sensing device or the like in a suitable place on the pipe laid in the factory, connect the sensing device or the like to a network or the like, and construct a system in which a higher-level apparatus adds up sensing data from the sensing device or the like via the network.

However, constructing the system that quantitatively manages the compression air to be used is cumbersome. In addition, the sensing data to be acquired is changed from moment to moment in accordance with an operation status the device that uses the compression air as a drive source, and thus the sensing data to be acquired with no change is not information suitable for management.

SUMMARY OF THE INVENTION

An object of the present invention is to provide a gas flow meter that can display information that a factory person in charge requests.

The abovementioned technical problem can be solved by providing a gas flow meter including: a flow rate measurement unit configured to measure a flow rate of gas in a pipe; a real-time clock configured to hold current time data, and update the current time data corresponding to a current time; a calculation unit configured to calculate integrated flow amount data from the flow rate measured by the flow rate measurement unit; a storage unit configured to store therein day-and-time information based on the current day-and-time data of the real-time clock in association with the calculated integrated flow amount data; and a screen generation unit configured to generate an integrated flow amount graph screen that includes a plurality of day-and-time sections that are temporally continued, graphically displays, in the past day-and-time sections in the plurality of the day-and-time sections, based on the day-and-time information and the integrated flow amount data stored in the storage unit, an integrated flow amount corresponding to each day-and-time section in the past day-and-time sections, and successively updates and graphically displays, in the day-and-time section including a current day-and-time in the plurality of the day-and-time sections, based on the integrated flow amount data successively calculated by the calculation unit, an integrated flow amount from a start of the day-and-time section to the current time.

The gas flow meter in the present invention is provided with a clock that ticks away the real-time. Further, time information of this clock is stored in association with the measured flow rate. Accordingly, for example, information indicating a history in a constant period, in other words, an integrated flow amount or the like can be easily generated. Further, graphically displaying the integrated flow amount enables a user to instantaneously grasp the history of the use amount only by seeing the display unit at a glance.

This past history is the integration of data in association with the time information, and thus is made by the internal processing of the flow meter. For example, the integrated use amount that is reset once a month is displayed on a display unit that is mounted to a gas meter, for example. In contrast, the period is not limited in the gas flow meter in the present invention. It is possible to cause the integrated use amount in the period necessary for a user to be displayed on the display unit. Accordingly, for example, it is possible to cause information necessary for a factory person in charge, typically, useful information for use amount management and the like, to be displayed on the display unit of the gas flow meter.

As the conventional technique, the integrated flow amount after the external input (for example, reset input) may be displayed naturally, in addition to this, it is possible to read an integrated flow amount in an arbitrary period specified by the user from the storage unit, and cause the integrated flow amount to be displayed. For example, an integrated flow amount of yesterday and an integrated flow amount of today are simultaneously displayed, thereby making it possible to know a difference between the use amounts of yesterday and of today. Moreover, integrated flow amounts on Monday one week ago and on Monday this week are simultaneously displayed, thereby making it possible to know a trend in a use status.

Functional effects and further objects in the present invention may be apparent from the detailed explanations for preferred embodiments below.

BRIEF DESCRIPTION OF THE DRAWINGS

FIG. 7 is a diagram for exemplarily explaining difference calculation and overflow processing;

DESCRIPTION OF EMBODIMENT

Embodiment

Figure 1:
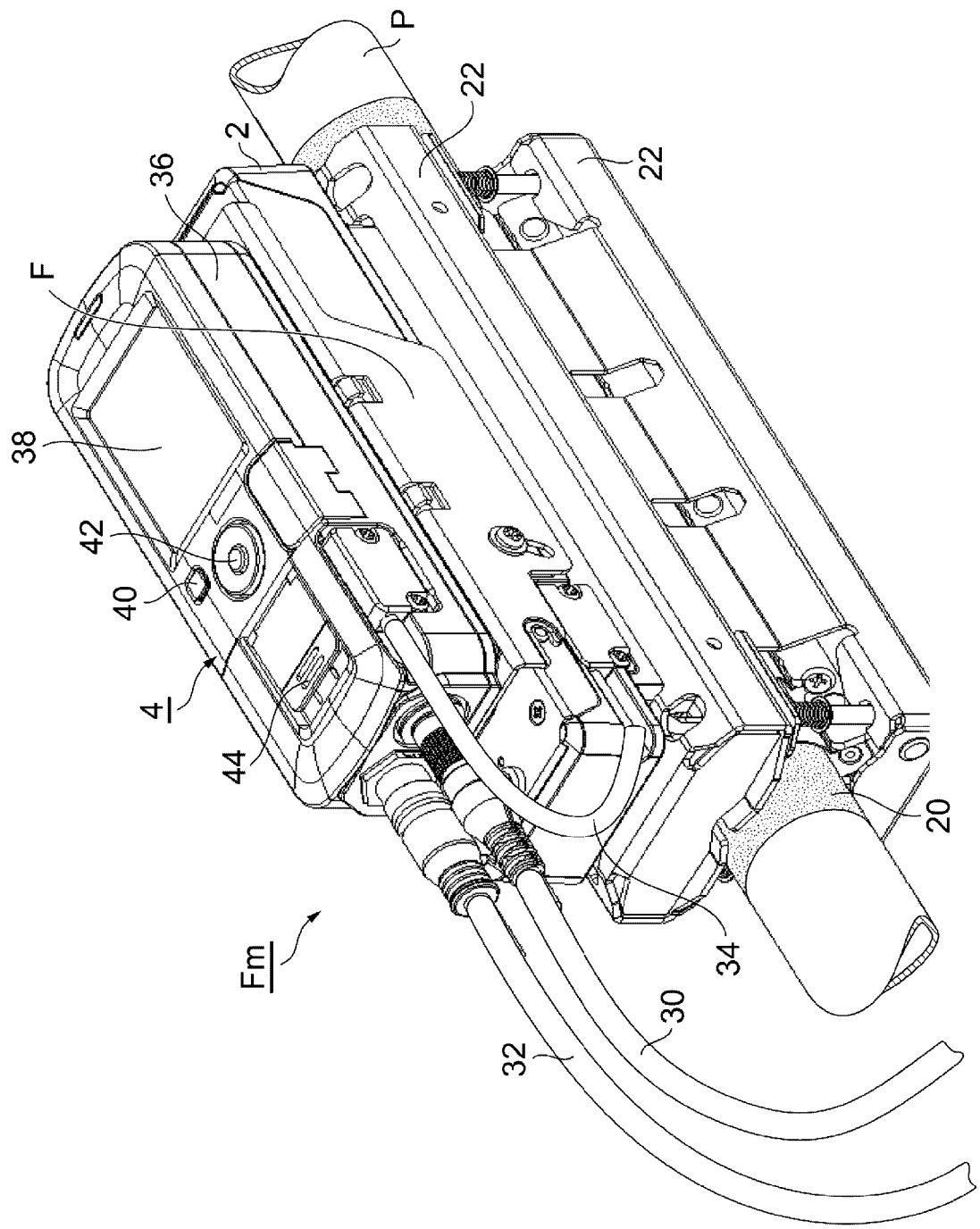
FIG. 1 is a perspective view illustrating a state where a clamp-on type ultrasonic flow meter to which the present invention is applied is mounted to a pipe.
Figure 2:
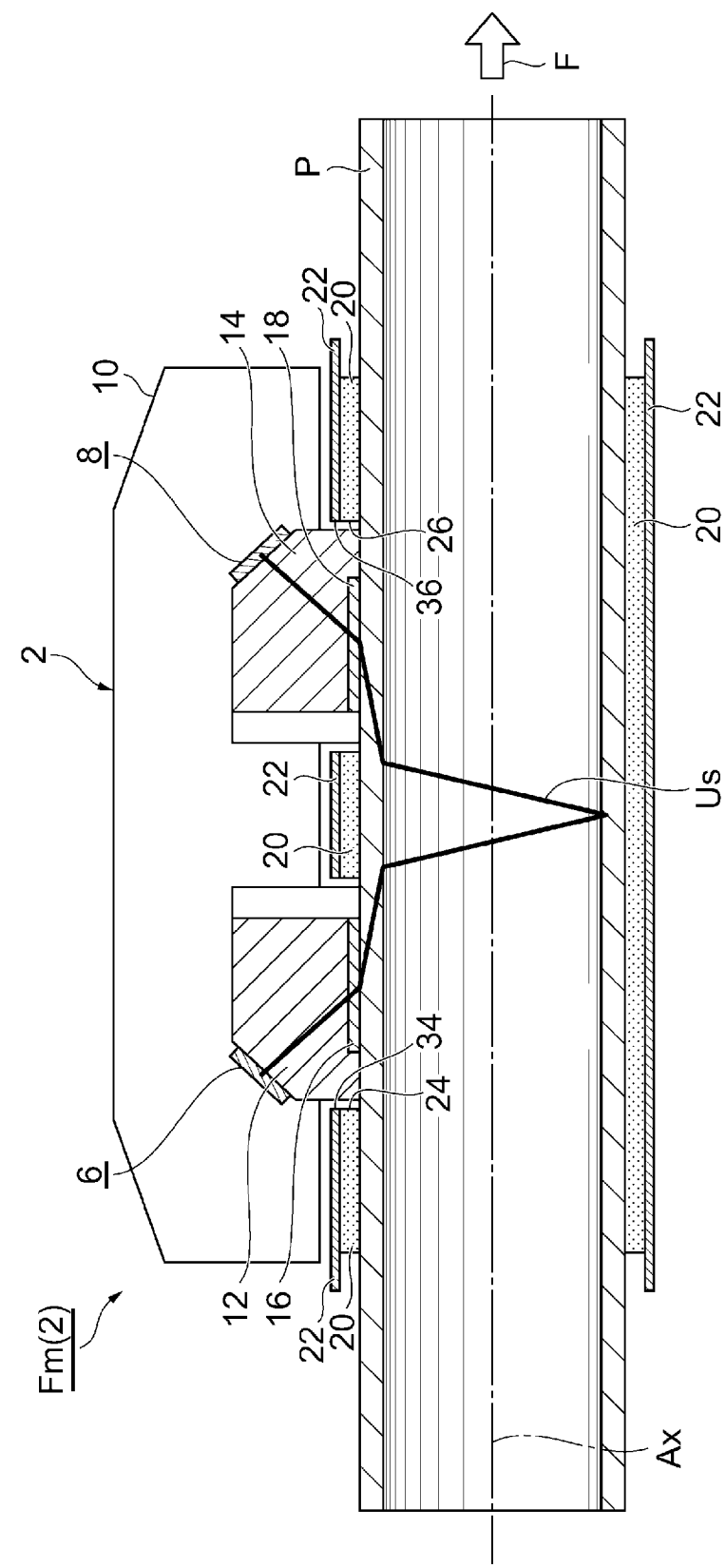
FIG. 2 is a cross-sectional view of a sensor main body of the gas flow meter illustrated in FIG. 1.
Figure 3:
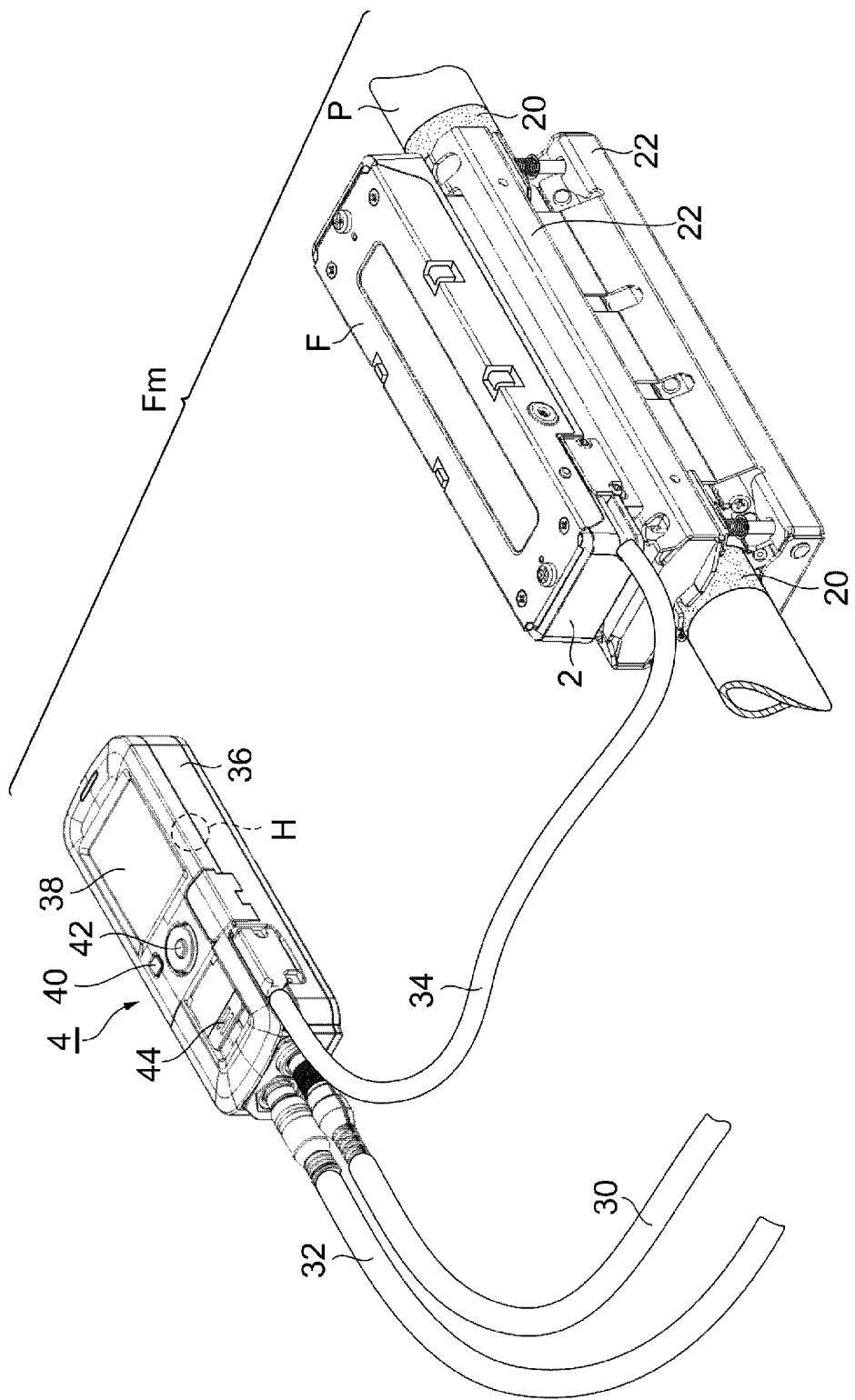
FIG. 3 is a perspective view for explaining a use form in which a display unit is used in a state of the display unit being isolated from the sensor main body.

An embodiment of the present invention is explained below with reference to the attached drawings. FIG. 1 is a perspective view illustrating a state where a clamp-on type ultrasonic flow meter to which the present invention is applied is mounted to a pipe, and FIG. 2 is a cross-sectional view of a sensor main body of the gas flow meter illustrated in FIG. 1. FIG. 3 is a perspective view for explaining a use form in which a display unit is used in a state of the display unit being isolated from the sensor main body.

A clamp-on type ultrasonic flow meter Fm in the embodiment is designed so as to be suitably applied to the measurement of the flow rate of the compression air and the nitrogen gas. When an explanation is made using the compression air as an example, with respect to operation apparatuses that use the compression air as an operation source in a factory, the gas flow meter Fm is retrofitted with a pipe P that supplies the compressed air by a compressor from a tank in which the compressed air is stored to the respective operation apparatuses.

The gas flow meter Fm includes a sensor main body 2 that is mounted to the pipe P, and a display unit 4, the display unit 4 includes a housing different from the sensor main body 2. In other words, the gas flowmeter Fm is an isolation type, and the sensor main body 2 and the display unit 4 are separate-body structures. Further, the display unit 4 is detachable to the sensor main body 2. Needless to say, the gas flow meter Fm may have an integral-body shape in which the sensor main body 2 and the display unit 4 are configured as one housing, for example.

The sensor main body 2 has a function of measuring the flow rate of a gas flowing inside the pipe P, and includes first and second ultrasonic devices 6 and 8 that transmit/receive ultrasonic waves and that are embedded therein, with reference to FIG. 2. In other words, the first and second ultrasonic devices 6 and 8 are fixedly disposed in the inside of a common main body housing 10. The first and second ultrasonic devices 6 and 8 typically include piezoelectric elements.

With reference to FIG. 2, in the clamp-on type ultrasonic flow meter Fm, the first and second ultrasonic devices 6 and 8 embedded in the sensor main body 2 are disposed being apart from each other in a direction of an axis line Ax of the pipe P, on a bus-bar of the pipe P. In other words, the sensor main body 2 is a clamp-on type flow meter of a so-called V-arrangement scheme or a reflection arrangement. In FIG. 2, a reference numeral Us schematically indicates a path of ultrasonic signals that are transmitted and received between the first and second ultrasonic devices 6 and 8. As illustrated in the drawing, the sensor main body 2 may emit ultrasonic waves so as to cross the pipe P, but is not limited thereto. The sensor main body 2 may generate a natural vibration mode of the pipe wall, preferably, Lamb waves or plate waves, in a tube wall of the pipe P. Needless to say, in this case, it should be understood that the illustrated path Us is schematically illustrated.

As a modification example, the first and second ultrasonic devices 6 and 8 that are included in the sensor main body 2 may be disposed so as to sandwich the pipe P therebetween and face each other. Specifically, the present invention is suitably applicable to a flow meter of a so-called Z-arrangement scheme in which the first ultrasonic device 6 is disposed on a first bus-bar of the pipe P, and the second ultrasonic device 8 is disposed on a second bus-bar facing the first bus-bar in a diametrical direction.

The sensor main body 2 includes a first wedge member 12 that is adjacent to the first ultrasonic device 6, and includes a second wedge member 14 that is adjacent to the second ultrasonic device 8. Moreover, the sensor main body 2 preferably includes first and second couplants 16 and 18 that are respectively adjacent to the first and second wedge members 12 and 14, and the first and second couplants 16 and 18 may preferably configure contact parts with respect to the pipe P. In order to improve the mounting workability, preferably, the first and second couplants 16 and 18 may include solid couplants.

In FIG. 2, a reference numeral 20 indicates a damping member. The damping member 20 is a sheet-like molded article having a moderate flexibility, and preferably having a prescribed thickness. The damping member 20 has a viscoelastic property, and preferably has an adhesiveness and a peel property with respect to the pipe P made of metal. When a worker moves a hand along the damping member 20, the damping member 20 is easily deformable along the surrounding of the pipe P.

The damping member 20 is disposed adjacent to the sensor main body 2, and is disposed in a state of being in contact with the pipe P and so as to surround the surrounding of the pipe P. Further, the damping member 20 is fixed to the pipe P by a damping fitting 22 that surrounds an outer circumference thereof, and is pressed against the pipe P by the damping fitting 22. In other words, the damping fitting 22 continuously maintains a pressure keeping function to the damping member 20.

The first and second ultrasonic devices 6 and 8 that are embedded in the sensor main body 2 are fixedly set to have a clearance of 1 to 15 cm, preferably 2 to 6 cm, for example, in the direction of the axis line Ax of the pipe P.

The damping member 20 and the damping fitting 22 include first and second damping windows 24 and 26 that are spaces, and the first and second damping windows 24 and 26 are positioned at positions corresponding to the first and second couplants 16 and 18.

With reference to FIG. 1 and FIG. 3, three waterproof cables 30, 32, and 34 are connected to the display unit 4. The first cable 30 includes a power supply cable that supplies power supply (for example, DC 24V) to the display unit 4, a first output cable that supplies an analog signal corresponding to the instantaneous flow rate from the display unit 4 to the outside, a second output cable that supplies a pulse signal corresponding to the integrated flow amount from the display unit 4 to the outside, and a third output cable that supplies an ON/OFF signal that is a comparison result with a threshold from the display unit 4 to the outside. The second cable 32 is an industry transmission cable, and includes, for example, an Ethernet IP communication cable or an EtherCAT (registered trademark) communication cable, a communication cable with a monitoring apparatus and an external PC, and a cable that supplies the flow rate of an object gas from the display unit 4 to the outside. The third cable 34 is a cable for connecting the display unit 4 to the sensor main body 2, and includes a cable that supplies power supply via the display unit 4 to the sensor main body 2, a cable that provides setting information to the sensor main body 2, and a cable that supplies measurement flow rate data from the sensor main body 2 to the display unit 4.

Subsequently with reference to FIG. 1 and FIG. 3, the display unit 4 includes a waterproof and dustproof case 36 that configures a housing of the display unit, and the waterproof and dustproof case 36 is separately provided from the sensor main body 2. The display unit 4 further includes a color liquid crystal 38 serving as a display device against which waterproof and dustproof measures are taken, a menu button 40 to which waterproof processing is applied, and an operation button 42 to which waterproof and dustproof processing are applied, and a selection function and a determination (SET) function that are used to select a menu or an icon displayed on the color liquid crystal 38 are given to the operation button 42. The display unit 4 further includes a USB port 44, and a not-illustrated lid is closed to make the USB port 44 waterproof and dustproof. The USB port 44 is used for connection with an external PC 46 (FIG. 4) for monitoring and/or for setting.

With reference to FIG. 1, the display unit 4 is positioned and fixed to the sensor main body 2 via a fitting F. The display unit 4 is preferably provided with a latch hole H (FIG. 3) on a back face thereof. The fitting F is detachable to the display unit 4, and is detachable to the sensor main body 2. When the display unit 4 is detached from the sensor main body 2, the display unit 4 is used desirably in a state of being latched by applying the latch hole H to a nail provided on a pillar or the like, for example.

Figure 4:
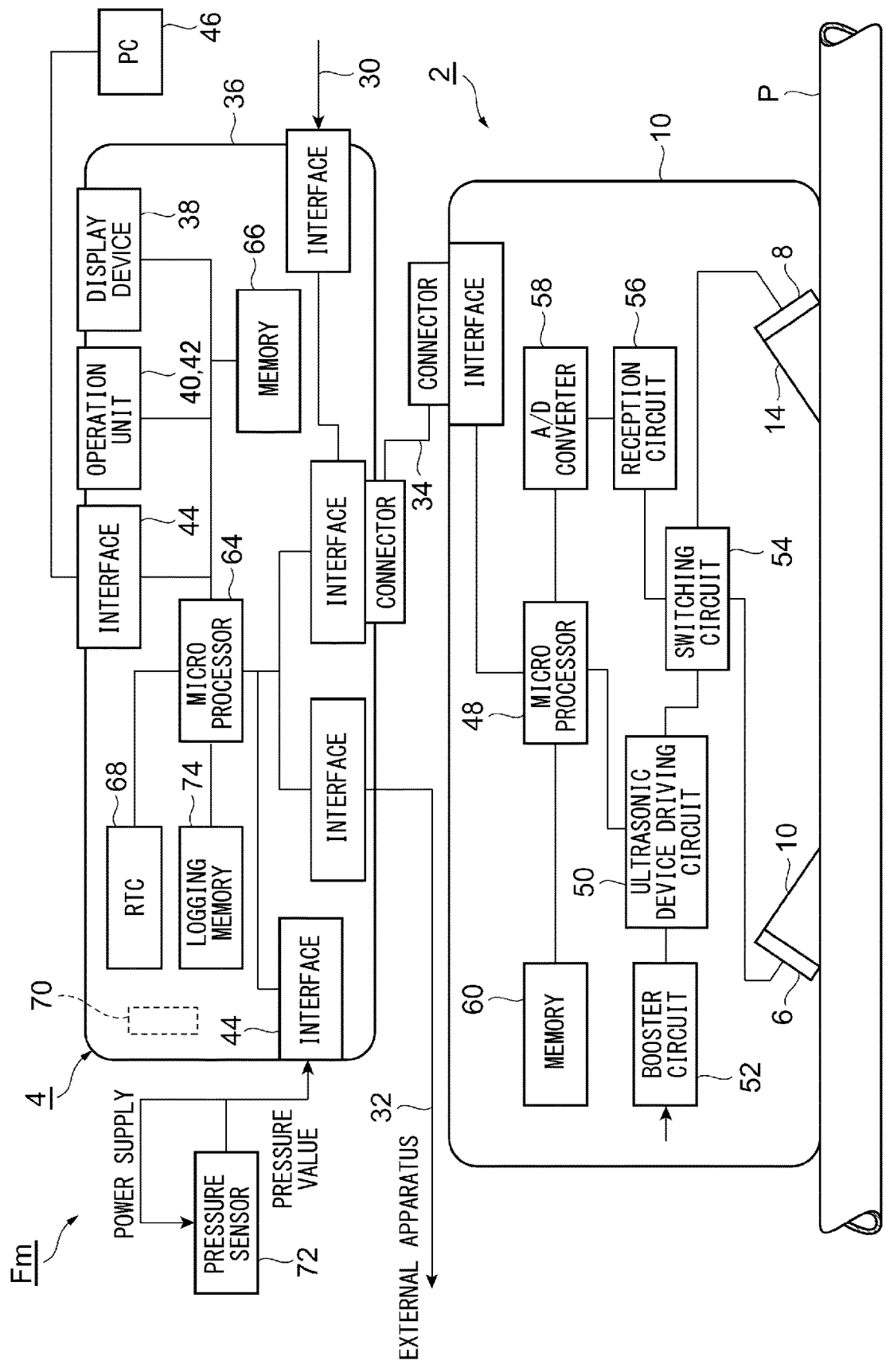
FIG. 4 is a diagram for explaining an internal structure of the sensor main body and the display unit.

FIG. 4 is a diagram for explaining an internal structure of the sensor main body 2 and the display unit 4. With reference to FIG. 4, the sensor main body 2 includes a micro processor 48 that configures a control unit of flow rate measurement, and an ultrasonic device driving circuit 50 that controls the irradiation of the first and second ultrasonic devices 6 and 8. A drive t voltage for the ultrasonic device 6 (8) is supplied to the ultrasonic device driving circuit 50 from a booster circuit 52. Output from the ultrasonic device driving circuit 50 is successively supplied the first and second ultrasonic devices 6 and 8 via a switching circuit 54. The switching circuit 54 is controlled to be switched in synchronization with the control of the irradiation of the first and second ultrasonic devices 6 and 8. Because of the switching circuit 54 being interposed, in a transmission state of an outgoing path, the first ultrasonic device 6 functions as a transmitter, and the second ultrasonic device 8 functions as a receiver. Similarly, in a transmission state of an incoming path, the second ultrasonic device 8 functions as a transmitter, and the first ultrasonic device 6 functions as a receiver.

Output from each of the ultrasonic devices 6 and 8 is supplied to a reception circuit 56 via the switching circuit 54. The reception circuit 56 amplifies an electric signal, and an A/D converter 58 coverts the amplified analog signal into a digital signal, which is input into the micro processor 48. The micro processor 48 communicates with a memory 60 in which a prescribed program is stored, and executes prescribed processing.

In order to compute a rate of flow flowing through the pipe P, information required for this computation is stored in the memory 60. The micro processor 48 typically aligns an outgoing path reception waveform and an incoming path reception waveform using the time of respective emission time points as an origin point, and performs waveform shape matching by causing the outgoing path reception waveform and the incoming path reception waveform to relatively displace from this aligned state in the time direction. The amount of time shift in which the degree of matching becomes maximum is determined as a propagated time difference, and a flow rate of gas is calculated on the basis of this propagated time difference.

The display unit 4 includes a micro processor 64 that is accommodated in a display unit housing separately from the sensor main body 2, in other words, in a waterproof case 36 (FIG. 3). The micro processor 64 configures a control unit that controls the display, and communicates with a memory 66 in which a prescribed program and a prescribed application are stored and executes prescribed processing.

The display unit 4 further includes a real-time clock (RTC) 68 that functions as a real-time clock, and the RTC 68 operates all the time by the power supply that is supplied from the first cable 30. As a modification example, a backup battery 70 is mounted on the display unit 4, and even when supplying the power supply to the display unit 4 is stopped, the backup battery 70 may enable the RTC 68 to continuously tick away the time in real time.

For example, a pressure sensor 72 mounted to the pipe P is connected to the display unit 4 via the USB port 44, and an internal pressure value of the pipe P is input into the micro processor 64. The micro processor 64 stores the flow rate data received from the sensor main body 2 in a logging memory 74. The logging memory 74 is preferably provided with a capacity capable of recording an integrated flow amount and a leak integrated amount at least for two years.

Note that, the integrated flow amount indicates the total amount of gas having passed through the pipe P from a first time point to a second time point, and normally indicates a total amount of gas having passed through the pipe P from a time point when a reset signal is input to a current time. When the integrated flow amount is based on a volume flow amount, the integrated flow amount is a volume of the gas having passed through the pipe P, and a unit thereof is cubic meter, for example. Moreover, when the integrated flow amount is based on a mass flow amount, the integrated flow amount is a mass of the gas having passed through the pipe P, and a unit thereof is kilogram, for example. The integrated flow amount indicates the total amount of gas having passed through the pipe P from the first time point to the second time point, and thus the integrated flow amount is referred to as a use amount in some cases, in the present description.

Figure 5:
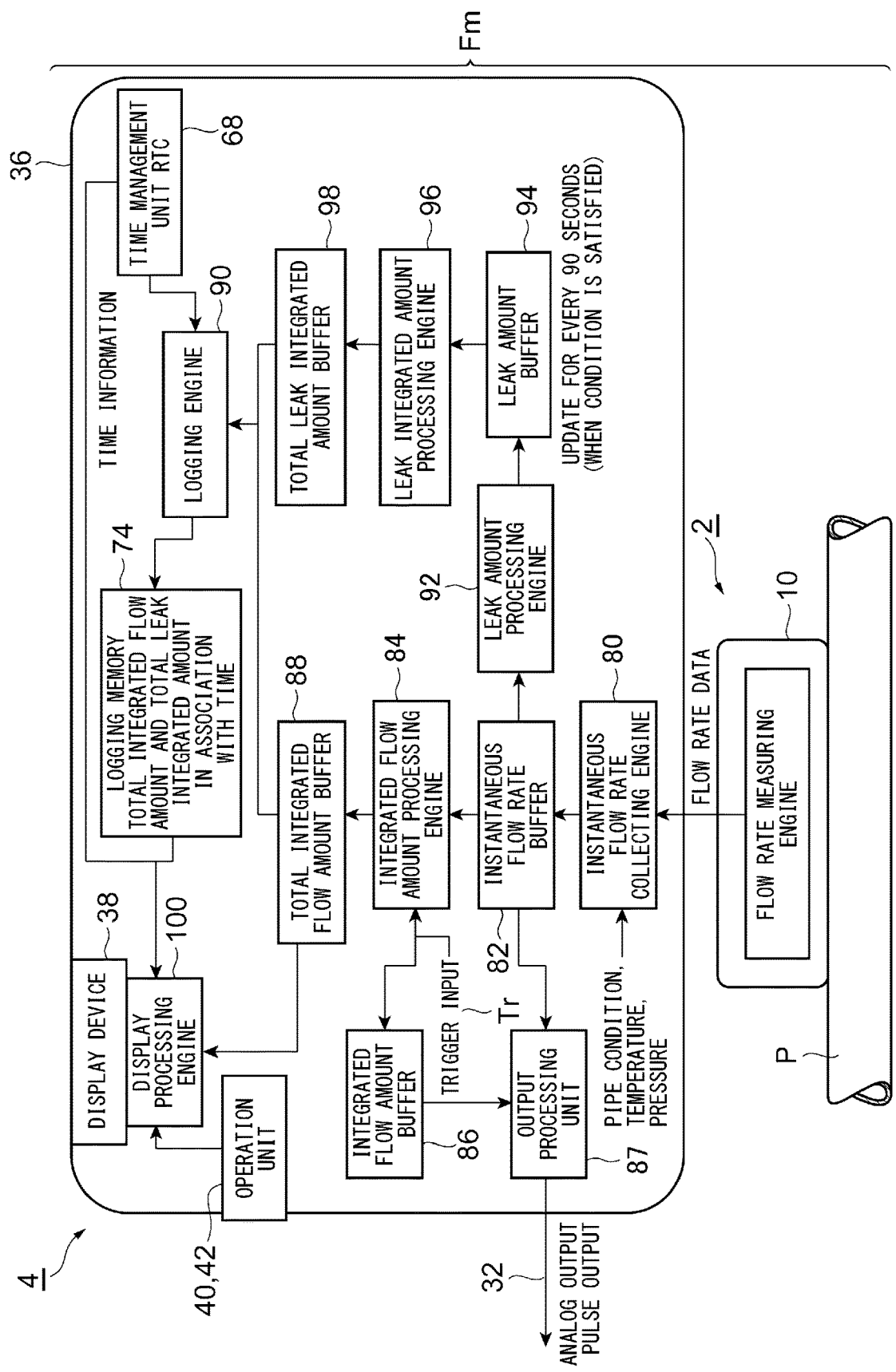
FIG. 5 is a function block diagram of the display unit.

FIG. 5 is a function block diagram of the display unit 4. The display unit 4 includes an instantaneous flow rate collecting engine 80 that accepts flow rate data to be supplied from the sensor main body 2. The instantaneous flow rate collecting engine 80 acquires flow rate data from the sensor main body 2, for example, for every 30 milliseconds. This collecting cycle time may be arbitrarily settable.

The instantaneous flow rate collecting engine 80 corrects the flow rate data on the basis of information such as a pipe condition, such as an inside diameter of the pipe P, an environment temperature, and a pressure inside the pipe P, and supplies flow rate data after correction as instantaneous flow rate data to an instantaneous flow rate buffer 82. The instantaneous flow rate data that is temporarily held in the instantaneous flow rate buffer 82 is updated, for example, for every 30 milliseconds. This update cycle time may be arbitrarily settable.

An output processing unit 87 outputs, on the basis of instantaneous flow rate data held in the instantaneous flow rate buffer 82, through the second cable 32 (FIG. 3), an analog signal indicating the instantaneous flow rate to the outside. Moreover, the output processing unit 87 outputs, on the basis of a comparison result of the instantaneous flow rate data held in the instantaneous flow rate buffer 82 with a threshold set in advance, through the second cable 32, an ON/OFF signal indicating the comparison result to the outside.

The instantaneous flow rate data is supplied from the instantaneous flow rate buffer 82 to an integrated flow amount processing engine 84, and the integrated flow amount processing engine 84 executes processing of calculating an integrated flow amount, on the basis of the instantaneous flow rate data, for every one millisecond, for example. A trigger signal from the outside can be input into the integrated flow amount processing engine 84, and the integrated flow amount processing engine 84 calculates an integrated flow amount the starting point of which is a time point when the trigger signal is input. In other words, the integrated flow amount processing engine 84 resets the integrated flow amount to zero at the time point when the trigger signal is input, and executes integrated processing based on the instantaneous flow rate data. This trigger signal corresponds to a reset signal. The integrated flow amount calculated by the integrated flow amount processing engine 84 is temporarily held in an integrated flow amount buffer 86 as integrated flow amount data. The integrated flow amount buffer 86 holds the integrated flow amount, as integrated flow amount data, the starting point of which is a time point when a trigger signal from the outside is input, and the integrated flow amount buffer 86 is updated for every one millisecond, for example. This update cycle time may be arbitrarily settable.

The integrated flow amount processing engine 84 may accept, in addition to a trigger signal from an external apparatus, a reset instruction from a user via operation units 40 and 42, reset the integrated flow amount to zero at the time point when the reset instruction is accepted, and execute integrated processing based on the instantaneous flow rate data. The trigger input illustrated in FIG. 5 includes the reset instruction from the user via the operation units 40 and 42, and the trigger signal from the external apparatus.

The output processing unit 87 outputs, on the basis of the integrated flow amount data held in the integrated flow amount buffer 86, through the second cable 32 (FIG. 3), a pulse signal indicating the integrated flow amount to the outside. Moreover, the output processing unit 87 outputs, on the basis of a comparison result of the integrated flow amount data held in the integrated flow amount buffer 86 with a threshold set in advance, through the second cable 32, an ON/OFF signal indicating the comparison result to the outside.

A total integrated flow amount buffer 88 temporarily holds a total integrated flow amount that is used for calculating an integrated flow amount (use amount) that is sectioned by time unit. The total integrated flow amount is one type of an integrated flow amount (use amount), and is an integrated flow amount (use amount) that is not reset by trigger input, which is unrelated to the time unit. In other words, the integrated flow amount processing engine 84 executes integrated processing based on the instantaneous flow rate data, without resetting the total integrated flow amount of the total integrated flow amount buffer 88. Note that, the integrated flow amount processing engine 84 may reset the total integrated flow amount of the total integrated flow amount buffer 88 by the periodical trigger input that is related to the time unit, and may execute integrated processing based on the instantaneous flow rate data. The total integrated flow amount buffer 88 is updated for every one millisecond, for example. This update cycle time is preferable to be arbitrarily settable.

The total integrated flow amount of the total integrated flow amount buffer 88 is stored in the logging memory 74 via a logging engine 90. The total integrated flow amount is stored in a region of the logging memory 74 that is sectioned by time unit of one hour and in a state of being associated with the time from the RTC 68.

As for a leak of the compression air, the leak amount varies by receiving influences of an operation status of an in-house device, a pipe internal pressure, an environment temperature, and the like. The current leak amount is determined, for example, by specifying the flow rate measured in the middle of the night or on a holiday when the in-house devices are stopped, and adding parameters such as an internal pressure of the pipe and the environment temperature thereto. As for this leak amount, a leak amount is computed in a leak amount processing engine 92 from the instantaneous flow rate buffer 82, and the leak amount obtained in the leak amount processing engine 92 is temporarily accumulated in a leak amount buffer 94, an integrated value of the leak amount is thereafter obtained in a leak integrated amount processing engine 96, and this integrated value is temporarily accumulated in a total leak integrated amount buffer 98, and thereafter is stored in the logging memory 74 via the logging engine 90. The total leak integrated amount is stored in a region of the logging memory 74 that is sectioned by time unit of one hour and in a state of being associated with the time from the RTC 68.

In the logging memory 74, when a storage format is sectioned by time, in other words, is defined by the time unit of one hour in advance, a log is added for every hour. A display processing engine 100 generates, on the basis of the total integrated flow amount and the total leak integrated amount stored in the logging memory 74, a displayed image of a use amount for every day-and-time section, a leak integrated amount for every day-and-time section, or the like. The displayed image generated by the display processing engine 100 is displayed on a liquid crystal monitor 38 that is a display device. In the liquid crystal monitor 38, for example, the display is updated for every 200 milliseconds. This display update cycle time is preferable to be arbitrarily settable.

Figure 6:
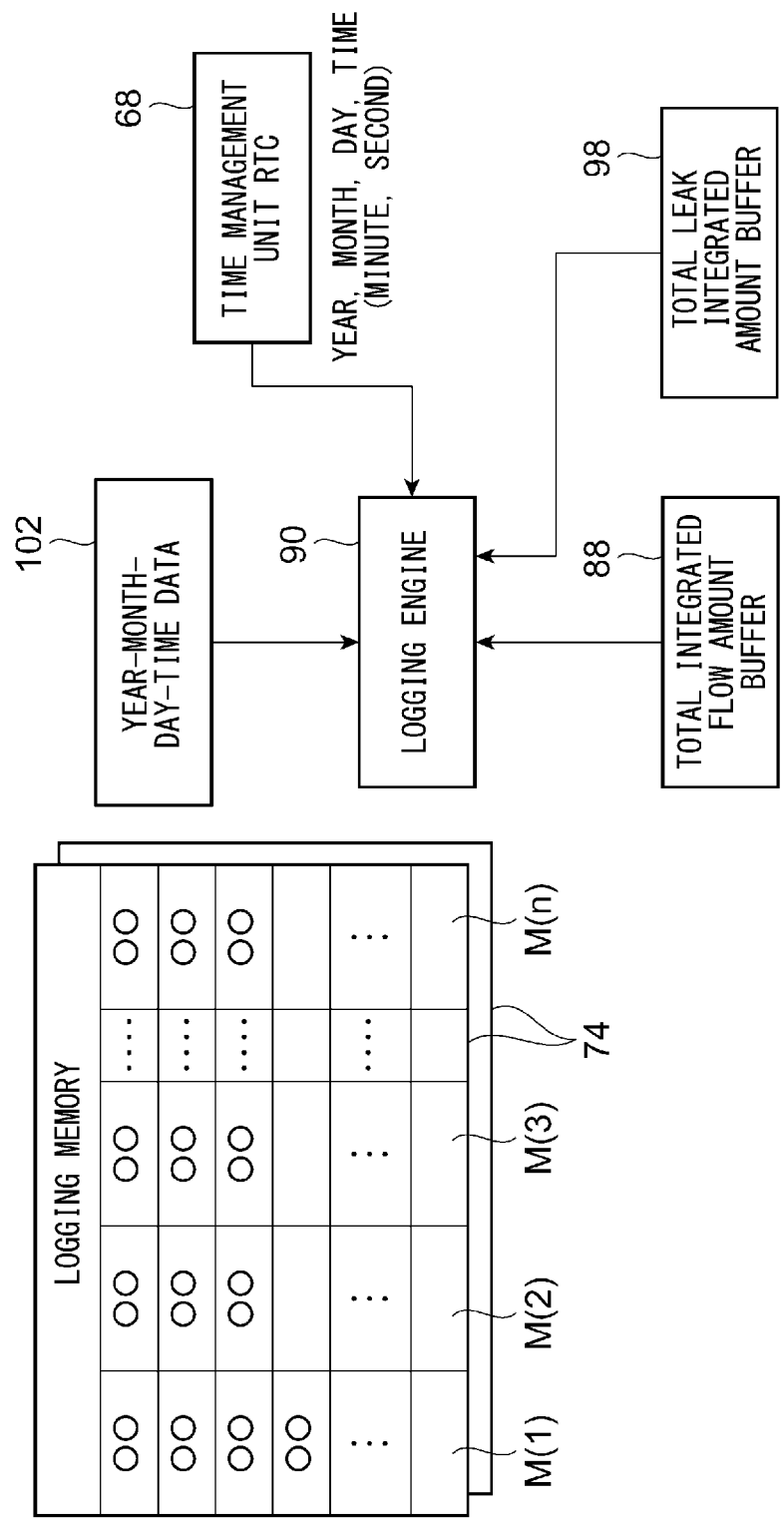
FIG. 6 is a diagram for explaining collecting display data in a memory.

Collection of display data in the logging memory 74 will be described with reference to FIG. 6. In the logging memory 74, the logging memory 74 includes, for example, memory regions M(1), M(2), . . . , M(n), which are sectioned for every hour and are temporally continued, and the total integrated flow amount and the total leak integrated amount are successively stored in each memory region M(n). In a state where year-month-day-time data 102 of a memory head address and time information (year-month-day-time information) of the RTC 68 are associated with each other, the total integrated flow amount and the total leak integrated amount are stored in the corresponding each memory region M(n). Further, in each memory region M(n), an address offset amount and a time offset amount are associated with each other from the head address. Accordingly, a memory address is uniquely determined with respect to a desired time, and thus there is an advantage that a time search is unnecessary. In other words, target data is not searched in the data stored in the logging memory 74, but data during a target period can be extracted from a correspondence relation between year, month, day, and time in the time information and the address. In other words, the logging memory 74 manages the real-time year-month-day-time, in other words, time information, by the RTC 68, this time information, in other words, the real-time year-month-day-time and the stored data are corresponded to each other in one-to-one. Therefore, the logging memory 74 can extract data during the target period from a correspondence relation between the time information and the address, and thus easily generates information indicating a display range set by the user, in other words, a history in the time width, in other words, an integrated flow amount or the like.

As mentioned in the above, the display unit 4 includes the real-time clock (RTC) 68 that functions as a real-time clock. Power supply can be supplied all the time through the first cable 30 connected to the display unit 4. Accordingly, it is possible to cause the logging memory 74 to continually store therein data in association with the time information of the RTC 68. Note that, the data that is stored in the logging memory 74 may be able to be copied to a nonvolatile recording medium, for example, an SD card.

Note that, in the total integrated flow amount buffer 88 and the total leak integrated amount buffer 98, when the number of digits of the buffer is exceeded, overflow processing in which integration is made from 0 (zero) is executed. Moreover, an integrated flow amount for each section region M(n) can be obtained from a difference in total integrated flow amount at each time, as will be described later, and the difference becomes minus when the overflow occurs. When the difference is minus, a total difference integrated amount is calculated by regarding that the overflow occurs. When an overflow occurs in each section region M(n), an accurate integrated flow amount cannot be calculated. Accordingly, the buffer size (number of digits) is preferably set, even when the integration is successively executed using the maximum flow amount and each section region M(n) is set large, such that an overflow occurs one time or less in the section region M(n). For example, when each section region M(n) is set in a unit of one month, setting the size of the buffer (number of digits) to the extent that an overflow occurs one time or does not occur in a unit of year can prevent an overflow from occurring twice or more in one month.

As for the difference calculation and the overflow processing, with reference to FIG. 7, when an example in which the total integrated flow amount is logged for every hour is exemplified and specifically explained, for example, the use amount during 1:00-1:59 (1:00:00 to 1:59:99) on Dec. 31, 2020 is calculated as 445 by obtaining a difference of the total integrated flow amount 9,999,312 during 1:00-1:59 on Dec. 31, 2020 from the total integrated flow amount 9,999,757 during 2:00-2:59 (2:00:00 to 2:59:99) on Dec. 31, 2020. Moreover, an overflow of the total integrated flow amount (overflow in 10,000,000) occurs during 2:00-2:59 on Dec. 31, 2020, the total integrated flow amount is decreased during 3:00-3:59, but by the overflow processing, 10,000,000 is added to the total integrated flow amount during 3:00-3:59 to obtain a difference, whereby the use amount during 2:00-2:59 on Dec. 31, 2020 is calculated as 460. Moreover, the use amount on Dec. 31, 2020 is calculated as 14,268, by obtaining a difference of the total integrated flow amount 9,999,156 during 0:00-0:59 on Dec. 31, 2020 from the total integrated flow amount 13,424 (overflow processing, 10,013,424) during 0:00-0:59 on Jan. 1, 2021.

Figure 8:
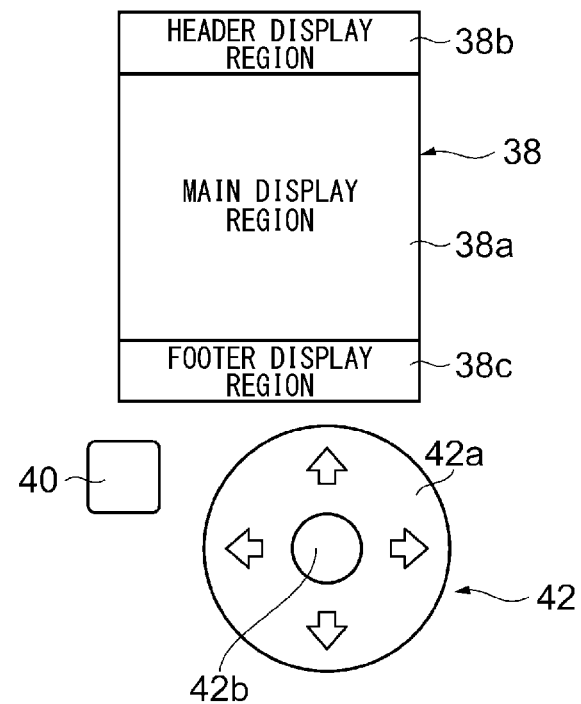
FIG. 8 is a diagram for explaining an overview of the display using a color liquid crystal that is a display device of the display unit.

With reference to FIG. 8, an overview of the display using a color liquid crystal that is a display device of the display unit 4 will be described. The color liquid crystal 38 has a rectangular shape, and in a display screen of the color liquid crystal 38, set are a main display region 38a in the central portion in the up-and-down direction, a header display region 38*b* on the upper side from the main display region 38*a*, and a footer display region 38*c* on the lower side from the main display region 38*a*.

Figure 9:
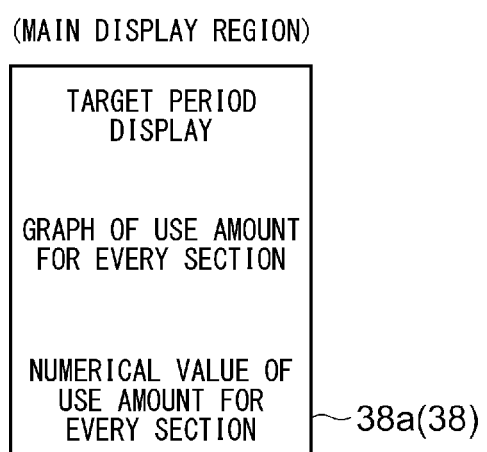
FIG. 9 is a diagram for explaining an example of items that are displayed in a main display region of the color liquid crystal.

FIG. 9 is a diagram for explaining an example of items that are displayed in the main display region 38*a*. In the main display region 38*a*, in addition to an instantaneous flow rate (current value) in which a numerical value of the display instantaneous flow rate is displayed, a display range set by a user, in other words, a history display of a time width, a graph display of the gas use amount for every section, and a history numerical value display of the gas use amount for every section, can be displayed. These display items may be simultaneously displayed, or may be selectively displayed on the basis of an operation by the user. The current value and the history are simultaneously displayed to enable the user to grasp a past history while grasping a current state. When the user changes the display range, in other words, the setting of the time width, the history display is immediately changed in response to this change.

Figure 10:
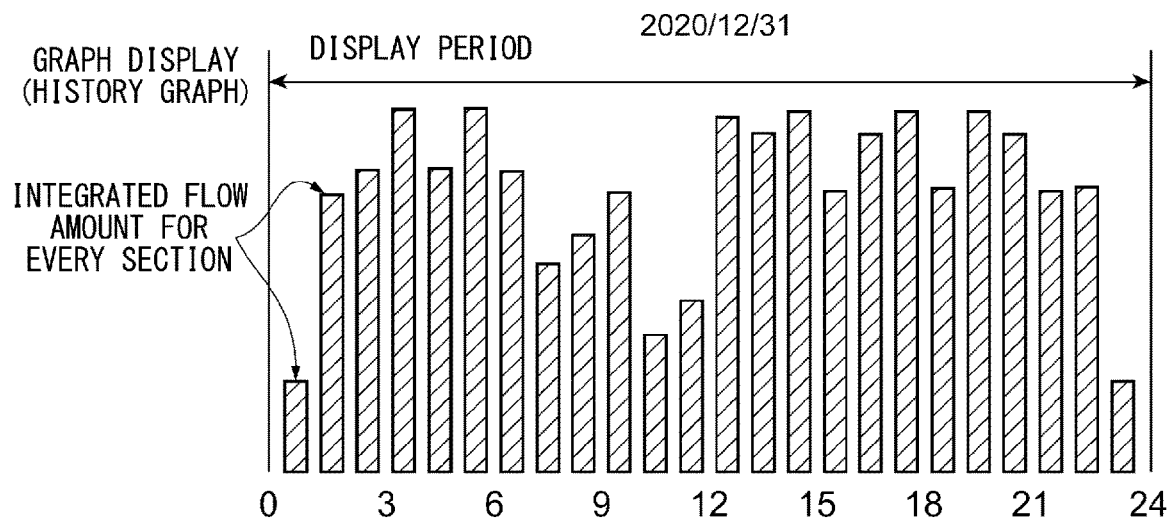
FIG. 10 is a diagram for explaining a graph display of a history.
Figure 11:
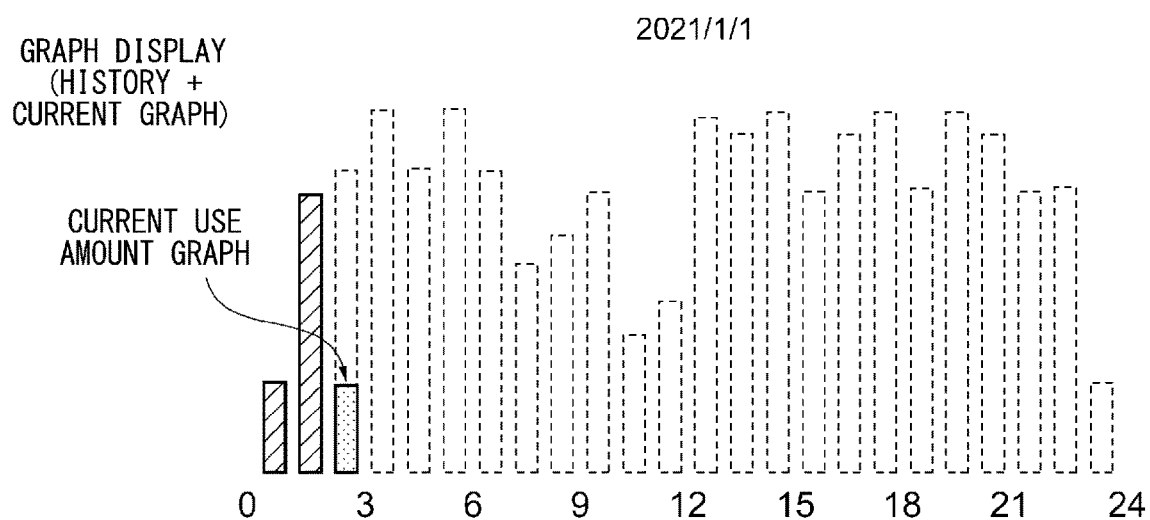
FIG. 11 is a diagram for explaining a graph display in each time section in a case of a display range including the current time.

FIG. 10 is a diagram for explaining a graph display of a history, and illustrates a bar graph that corresponds to the integrated flow amount (use amount) corresponding to each day-and-time section (in the illustrated example, one hour) in the display range, on the basis of the total integrated flow amount in association with the time stored in the logging memory 74. FIG. 11 is a diagram for explaining a graph display in a display range including the current time. A bar graph that is displayed with the current day-and-time section is displayed on the basis of the latest total integrated flow amount, in the total integrated flow amount held in the total integrated flow amount buffer 88 and the total integrated flow amount in association with the time stored in the logging memory 74, and is extended from time to time and from moment to moment in accordance with an update of the total integrated flow amount held in the total integrated flow amount buffer 88. In other words, not only a bar graph corresponding to the current day-and-time section from 2:00 to 3:00, a bar graph corresponding to the past day-and-time section from 0:00 to 2:00 can be displayed using the total integrated flow amount in association with the time stored in the logging memory 74. The graph is displayed using the day-and-time section with high periodicity and high regularity, so that a comparison with the past state becomes easy. Accordingly, even if an accurate value of the use amount in a normal state has not been grasped, a quantitative comparison with the past state becomes easy, and thus the management of gas such as the compression air becomes easy, for example.

In the display in the display range including the current time, a bar graph of the history for every corresponding day-and-time section in the past period range may be superimposed and displayed at a position of the corresponding day-and-time section. In this superimposed display, for easy identification from the bar graph of the history, for example, a different-color or translucent display mode may be preferably employed. When the user changes the display range, in other words, changes the setting of the time width, on the basis of the total integrated flow amount in association with the time stored in the logging memory 74, the graph display can be immediately changed to the graph display corresponding to this change.

In the display related to the history display, a date corresponding to the display period is displayed. When day is selected, year, month, and day are displayed, and when month is selected, year and month are displayed, and when year is selected, year is displayed. With reference to FIG. 8, the display item in the target period can be selected with the menu button 40, and an up-down-left-right button 42*a* of the operation unit 42, and the selected change can be confirmed with a SET button 42*b*.

As a section corresponding to the display range (time width) in the graph display, when day is selected as the display range, a total integrated flow amount in every section for every hour (0:00-0:59 to 24:00-24:59) on the day is preferably displayed as a bar graph as a history graph display. In place of the bar graph, a line graph may be displayed. Moreover, the bar graph and the line graph may be selectable. When month is selected as the display range, the total integrated flow amount is displayed as a bar graph in sections in the month, in other words, continuous every day from the 1st to 31st. In place of the bar graph, a line graph may be displayed. When year is selected as the display range, the total integrated flow amount is preferably displayed as a line graph in sections in the year, in other words, continuous every month from January to December. In place of the line graph, a bar graph may be displayed.

As for the graph display, a display range, such as the week, a half-year period, in the morning, and in the afternoon, the limited time width (for example, three hours) may be selectable. When week is selected as the display range (time width), a bar graph is displayed as a history graph of a total integrated flow amount in continuous days of the week as sections in the week. In place of the bar graph, a line graph may be displayed. When a half-year period is selected as the display range (time width), the total integrated flow amount in respective weeks, in other words, 1st to 26th weeks, as sections in the half-year period is displayed as a bar graph. In place of the bar graph, a line graph may be displayed. When the display range of the morning or the afternoon is selected, a total integrated flow amount for every 30 minutes, as a section, for example, is displayed as a bar graph. In place of the bar graph, a line graph may be displayed. For example, when the display range (time width) of three hours is selected, a total integrated flow amount for every 10 minutes, as a section, for example, is displayed as a bar graph. In place of the bar graph, a line graph may be displayed.

Whether a bar graph is displayed or a line graph is displayed may be selectable. Moreover, whether a graph display is used or a numerical value display is used may be also selectable. Moreover, the graph display and the numerical value display may be displayed in a switchable manner.

A first display range including a day-and-time section including the current time and one or a plurality of past day-and-time sections continuous thereto, and a second display range including a plurality of continuous day-and-time sections past from the first display range, are switchable during the flow rate measurement being operated. After the operation of this switching, integrated flow amount data corresponding to each day-and-time section is immediately graphically displayed. After the display of this second display range, when a period with no operation by the user is continued for a certain period, the display may be automatically switched to the display of the first display range.

Figure 12:
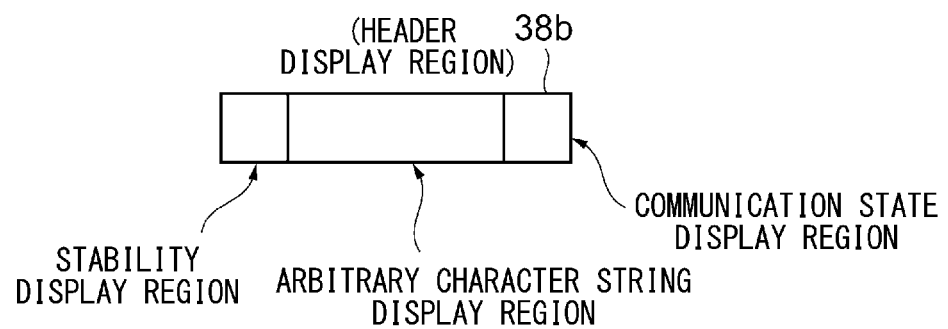
FIG. 12 is a diagram for explaining a header display region that is displayed in an upper portion of the color liquid crystal.

With reference to FIG. 12, the header display region 38*b* is used for displaying information that is convenient to be displayed over a plurality of screens, for example, the stability of the flow rate measurement is graphically displayed or bar-displayed, displaying an arbitrary character string, for example, the character string set by the user, and displaying the communication state.

Figure 13:
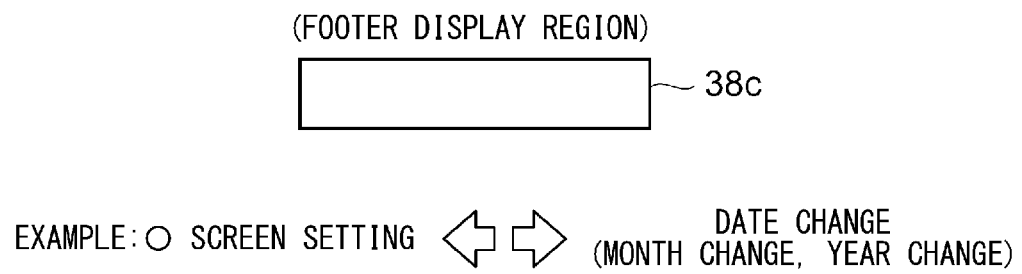
FIG. 13 is a diagram for explaining a footer display region that is displayed in a lower portion of the color liquid crystal.

The footer display region 38*c* is used for displaying an operation guide, for example. A specific example is illustrated in FIG. 13. For example, a circular icon indicating the SET button 42*b* is displayed for screen setting, and a pair of triangular icons indicating the left and right operation of the up-down-left-right button 42*a* and directing left and right is displayed for the operation of the date change, the month change, or the year change.

Figure 14:
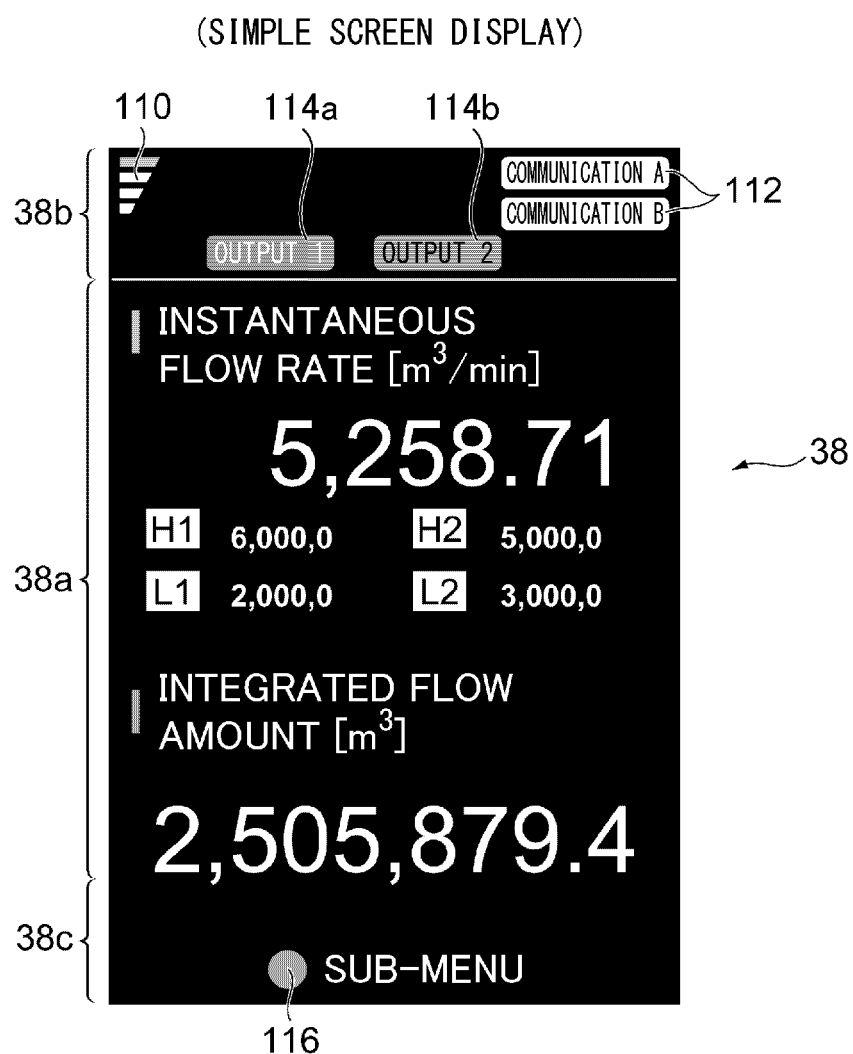
FIG. 14 is a view illustrating a display screen that displays an instantaneous flow rate.

FIG. 14 to FIG. 18 illustrate concrete examples related to the display. FIG. 14 illustrates a display screen displaying an instantaneous flow rate. When this display screen is called "simple screen", in the simple screen display, a numerical value display of the instantaneous flow rate (current flow rate value), for example, "5,258.71" is displayed in the main display region 38*a* of the color liquid crystal 38. Moreover, in the main display region 38*a*, numerical values of thresholds H1 and L1 for first output and thresholds H2 and L2 for second output are displayed. Although two thresholds H and L for each output are provided in this display example, one threshold may be provided.

As the illustrated display example, in a case of two thresholds H and L, when the instantaneous flow rate (current value) is between H and L, ON is may be set, or conversely, when the instantaneous flow rate (current flow rate value) is between H and L, OFF may be set. In a case of one threshold, when the instantaneous flow rate (current flow rate value) exceeds a threshold, ON may be set, and conversely, when the instantaneous flow rate (current flow rate value) exceeds a threshold, OFF may be set. It is preferable to be capable of setting a threshold for every output, in other words, two thresholds or one threshold, selecting a state for ON, and setting a threshold. These selection and setting can be made by operating the menu button 40 and the operation button 42 during the flow rate measurement being operated.

Herein, in addition to the volume flow amount (real flow amount) in a measurement state, whether a conversion flow amount such as a volume flow amount (normal flow amount) in a normal state or a standard flow amount at the reference temperature of 20° C. is displayed may be selectable, and these selections can be made by the menu button 40 and the operation button 42 being operated.

In the main display region 38*a*, the numerical value of an integrated flow amount may be displayed. Whether this integrated flow amount is displayed may be selectable. Herein, the integrated flow amount is an integrated flow amount from the time point when a reset signal is input by the trigger input from the outside and the button input. In place of the integrated flow amount, whether the use amount or the leak amount is displayed may be selectable. These selections can be made by the menu button 40 and the operation button 42 being operated.

In the header display region 38*b*, a graph display 110 that imitates a measurement stability display lamp is displayed. In place of the graph display 110, a bar display may be used. The graph display 110 displays whether the flow rate has been measured with stability.

In the header display region 38*b*, communication information 112 on each of "communication A" and "communication B" is further displayed. The communication A means USB communication meaning, for example, and the communication B means IO-LINK communication, for example.

In the header display region 38*b*, an ON/OFF output display lamp 114 is further displayed. In the illustrated example, the ON/OFF output display lamp 114 includes a display lamp 114*a* for the first output and a display lamp 114*b* for the second output, and the display lamp 114*a* for the first output is in an ON state and the display lamp 114*b* for the second output is in an OFF state.

To set a threshold for each output, a menu button 42 is operated in accordance with an icon 116 that is displayed in the footer display region 38*c* to call a sub-menu, and a threshold for each output can be set in this sub-menu.

Figure 15:
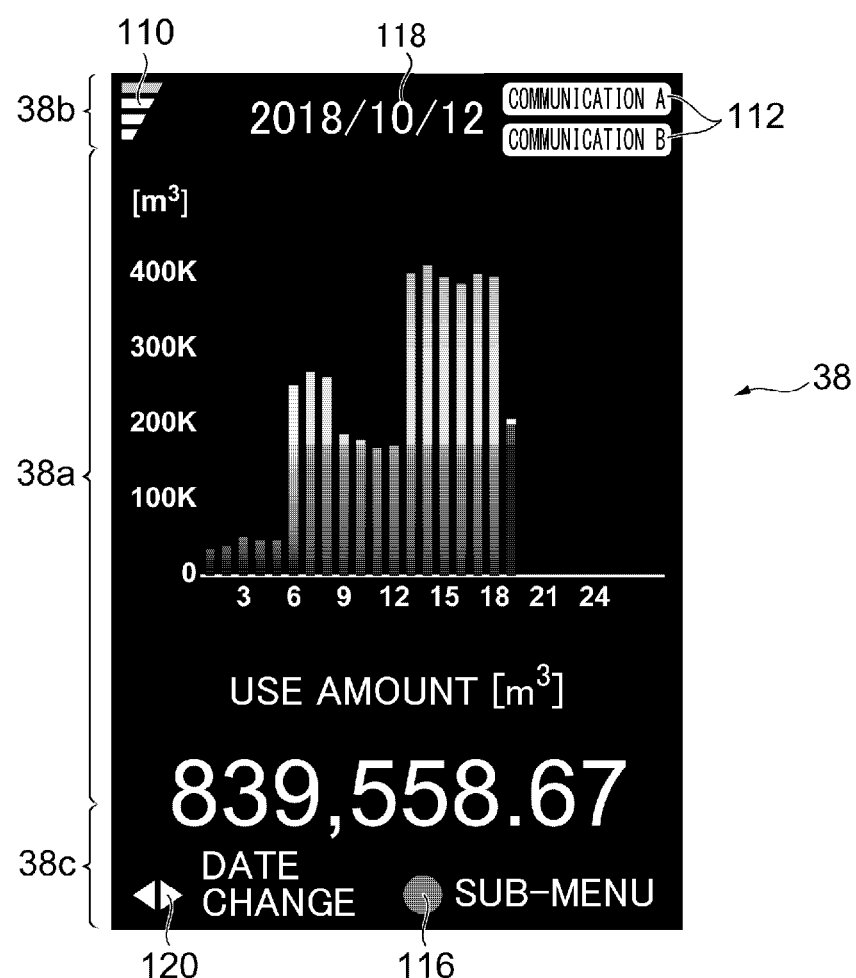
FIG. 15 is a view illustrating a display screen that simultaneously displays a graph and a numerical value of the use amount.

In the explanations of display screens in FIG. 15 and thereafter, the reference numerals are assigned in the common display, and explanations thereof are omitted. FIG. 15 illustrates a screen on which a bar graph of the use amount and a numerical value are simultaneously displayed. In the header display region 38*b*, a display range (period range) 118 of the use amount is displayed as year, month, and day. The screen illustrated in FIG. 15 illustrates a case of the unit of "day". Herein, "2018" means year, "10" means October, and "12" means twelfth day. In a case where the display uses the unit of "month", "2018/10" is displayed, and in a case of the unit of "year", "2018" is displayed. For example, in a case of a "week" unit, "2018/35-36 weeks" may be displayed. To set this display range (period range), in other words, to set the time width, the menu button 40 is operated in accordance with the icon 116 of a sub-menu displayed in the footer display region 38*c* to select the sub-menu, and the display range can be set from the displayed sub-menu. This setting change can be made during the flow rate measurement being operated, and the setting change of the display range is immediately reflected to the graph display the integrated flow amount. In the sub-menu, for example, selection choices of "day", "month", and "year" are displayed, and the user may be caused to select one among the three selection choices. Moreover, in the sub-menu, the user may be caused to select one display language among multiple selection choices.

The display screen in FIG. 15 displays the case where the display range is the unit of "day" and the section is the unit of "time", as mentioned as the above. Therefore, each graph in the bar graph is displayed in the unit of time. The scale width of the bar graph is auto-scaled in accordance with the maximum use amount, in the use amount in each section in the display range.

In a case where the display range is the unit of "month", the section is the unit of "day", and in a case where the display range is the unit of "year", the section is the unit of "month". In a case of the unit of "week", the section is the unit of "day". These display ranges, in other words, the time widths are changeable during the flow rate measurement being operated.

On the display screen illustrated in FIG. 15, the integrated use amount (integrated flow amount from 0:00 to the current time) in the display region is numerically displayed. In other words, the total amount of the respective use amounts displayed as a bar graph is numerically displayed. When the display range is the unit of "month", the total of the use amount on the month is numerically displayed. When the display range is the unit of "year", the total use amount in the year is numerically displayed. In a case where the display range includes the current time, the numerical value of the use amount is increased from moment to moment in accordance with the (instantaneous) flow rate.

The use amount displayed in the main display region 38*a* means the integrated value (integrated flow amount) of the flow amount in each section. The "integrated flow amount" having been explained with reference to FIG. 14 is an integrated value from when a reset signal is input. FIG. 15 illustrates a state during 18:00-18:59, in which the bar graph during 18:00-18:59 is extended from moment to moment in accordance with the instantaneous flow rate (current use amount). On the other hand, a bar graph (from 0:00 to 18:00) from 0:00-0:59 to 17:00-17:59 illustrates a past state (history of the use amount). Preferably, the history value and the current value (use amount during 18:00-18:59) may be classified by color and displayed.

In the footer display region 38c, an icon 120 for date change is displayed. The icon 120 includes a pair of triangles directing left and right, and the left-right button in the up-down-left-right button 42a of the operation button 42 indicated by the icon 120 having the pair of triangles is operated to allow the date in the display range (period range) to be changed. For example, when the date is changed to the previous day "2018/10/11", in all the period from 0:00-0:59 to 23:00-23:59 (from 0:00 to 24:00), the past state (history of the use amount) is displayed.

In the main display region 38a, in addition to the display of use amount, the simultaneous display of use amount+leak amount, the display of leak amount, or the like can be selected. The selection of the display content can be performed by selecting a sub-menu, and selecting a display item in the sub-menu.

Figure 16:
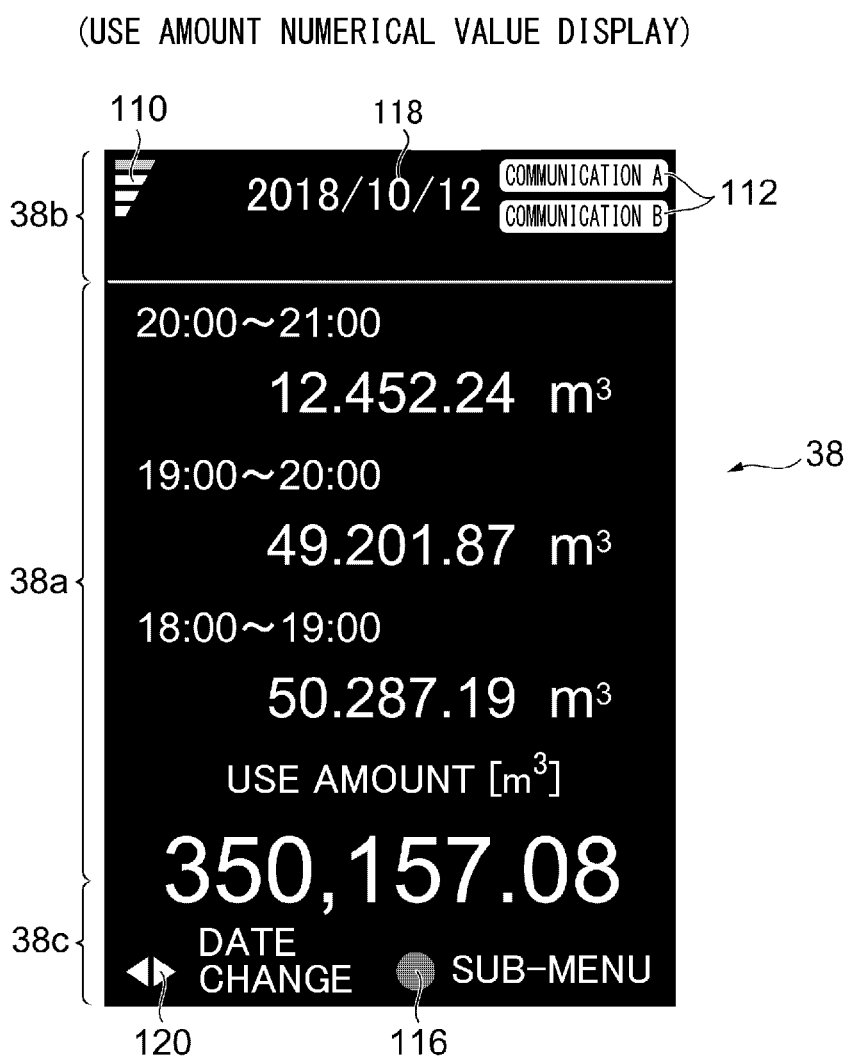
FIG. 16 is a view illustrating a display screen that displays the use amount.

The display screen illustrated in FIG. 16 numerically displays thereon the use amount. In the main display region 38a, the section use amount and the integrated use amount in the display range (flow amount integrated from 0:00 to the current time) are numerically displayed.

Figure 17:
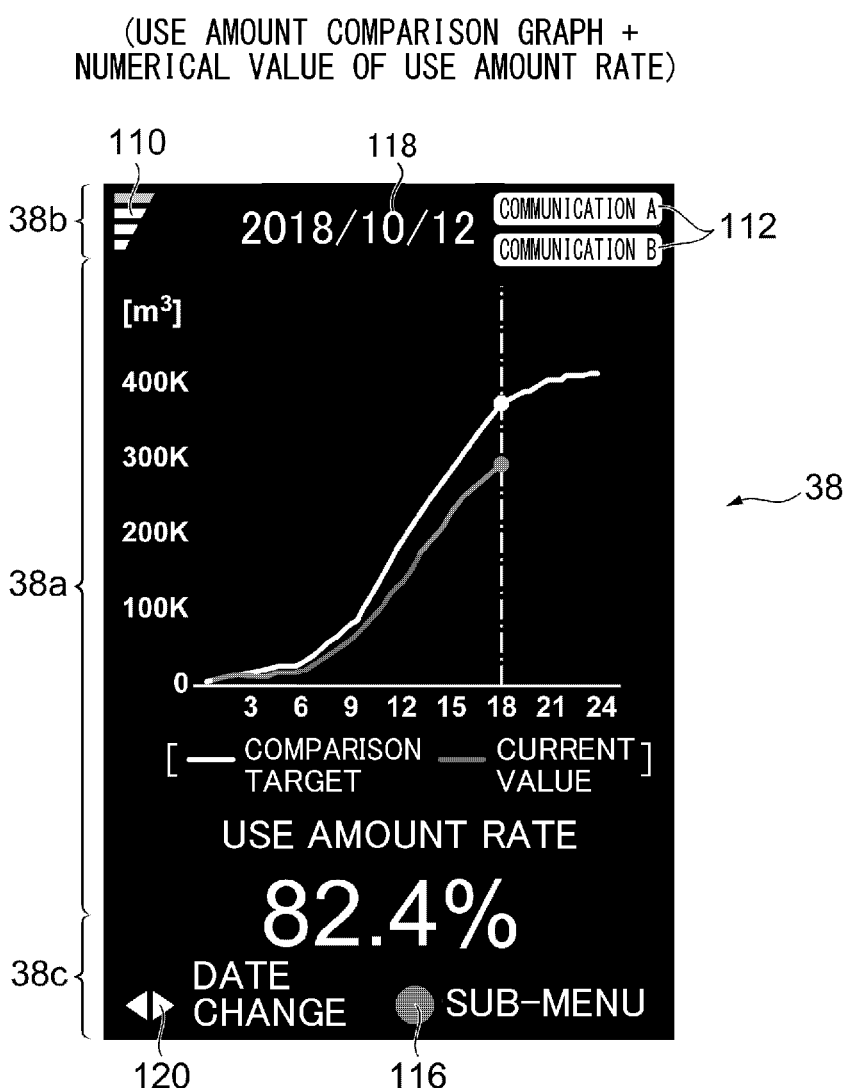
FIG. 17 is a view illustrating a display screen that simultaneously displays a use amount comparison graph and a comparison rate.

The display screen illustrated in FIG. 17 simultaneously displays a use amount comparison graph in which the use amount in a first display range and the use amount in a second display range are superimposed and displayed, and a numerical value of the use amount rate. The use amount comparison graph is displayed as a line graph, and is not necessarily displayed, because the day, the month, and the year in a case of a display range including the current time, in a display range of the line graph as a comparison target, are exactly the same as those at the current time. The display range can be set by selecting a sub-menu, and performing setting in the sub-menu.

In this setting change, when a user operates the operation unit 42 during the flow rate measurement being operated, the operation by the user is accepted, and the setting change of display range is made. Further, the graph display is changed corresponding to this setting change of display range. Further, thereafter, when a period with no operation by the user is continued for a certain period, the setting of the display range may be automatically switched to the original display range.

In addition, after the setting has been switched from the first display range to the second display range, when the setting is switched to the third display range with the operation by the user, a use amount graph corresponding to the first display range and a use amount graph corresponding to the third display range are displayed by comparison at display positions in the display range being aligned.

In the use amount comparison graph, a line graph of the history use amount in the past specified display range and a line graph of the use amount in the display range including the current time are superimposed and displayed. In other words, the two types of line graphs are displayed by being aligned with the common axis. A line graph serving as a comparison target may be displayed as a ghost. The use amount comparison graph indicates the use amount (flow amount integrated from 0:00 to the relevant time) from the start of the display range to the relevant time, and corresponds to the section use amounts being integrated. Preferably, a vertical dashed line indicating the current position may be displayed. Moreover, a circular mark may be displayed at a point orthogonal to the vertical dashed line indicating the current position on each line graph.

As a modification example, the same sections (the same relative section in different display ranges: for example 18:00-18:59) in different display ranges may be displayed by comparison. Moreover, the date serving as a comparison target can be changed by operating the operation button 42. In this case, the same sections in the display range including the current time and the comparison target after the change are displayed by comparison.

As a use amount rate, the rate in the same sections (the same relative section: for example 18:00-18:59) in different display ranges can be displayed. The current use amount (flow amount integrated from 0:00 to the current time) is displayed as the percentage when the use amount in the same section of the comparison target as 100. As a modification example, the current use amount may be displayed as the percentage when the total use amount (the use amount at 24:00) in the display range of the comparison target is 100.

In the display screen of FIG. 17 in which the display related to the use amount is made, the display can be switched to the display related to the leak amount with the operation by the user (sub-menu). In the display of the leak amount, a leak amount history comparison graph and a numerical value of the leak amount rate are simultaneously displayed.

Figure 18:
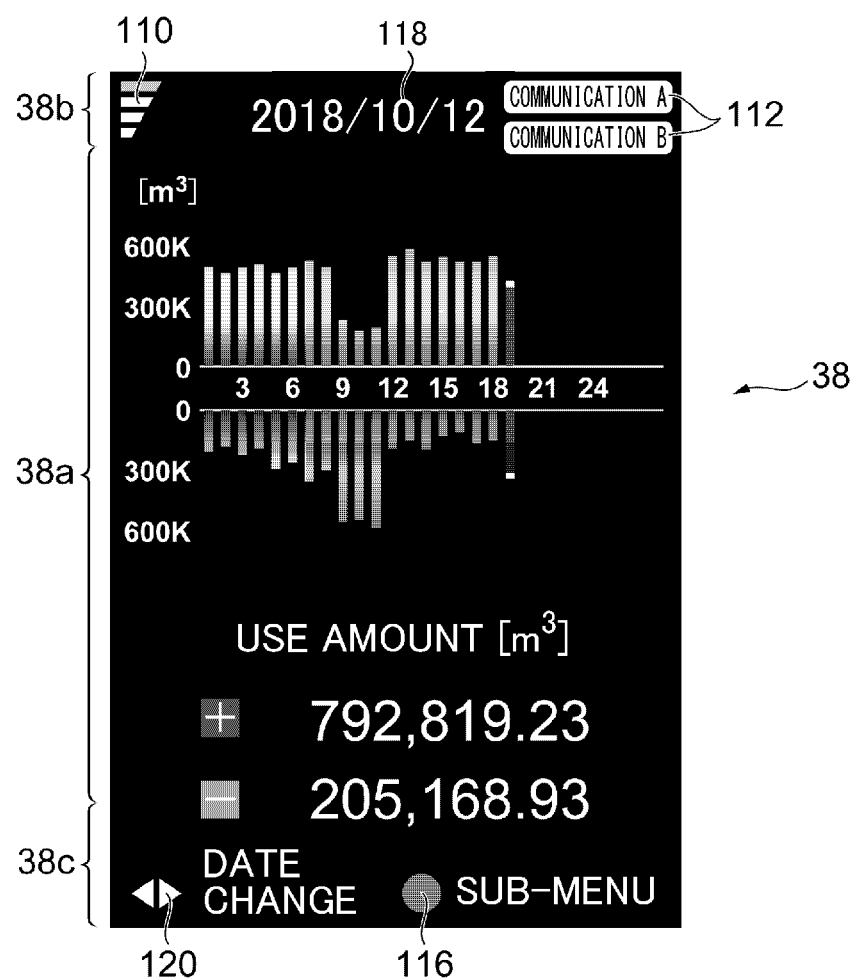
FIG. 18 is a view illustrating a display screen that displays the use amounts in a plus direction and a minus direction with bar graphs and numerical values.

In the display screen of FIG. 18, in a loop pipe, for example, bar graphs of the use amounts in the plus direction and in the minus direction and numerical values thereof are simultaneously displayed. Herein, when a first direction along the axis line Ax of the pipe P is defined as plus, and the reverse direction of the first direction is defined as minus, and the flow amount is integrated separately in the plus direction and in the minus direction, the bar graph of the use amount in the plus direction, the bar graph of the integrated use amount for every section of one hour in the illustrated example, means the flow amount in the plus direction, and the flow amount of the use amount in the minus direction is displayed as a bar graph of the use amount in minus direction. In the illustrated display example, the bar graph positioned above from the horizontal axis (time axis) indicates the integrated use amount in the plus direction for every hour, and the bar graph positioned below therefrom indicates the integrated use amount in the minus direction for every hour.

In the main display region 38a of the display screen in FIG. 18, "+" seen in the numerical value display of the displayed use amount indicates a total of use amounts, in other words, an integrated value of the use amount, in the plus direction display range, and "−" indicates a total of use amounts, in other words, an integrated value of the use amount, in the minus direction.

Individually displaying the use amounts in both direction of the plus direction and the minus direction is used, for example, for the management in a case of transferring the compression air between the factories, and a case where a direct flow (plus direction) and a back flow (minus direction) can be present such as loop piping. With reference to FIG. 14 to FIG. 18, the display device, in other words, the color liquid crystal 38, in the display unit 4 is used to enable not only the instantaneous flow rate but also various information to be supplied to the user. Accordingly, the user can directly use the information displayed on the color liquid crystal 38 and execute the rational and rapid factory management without processing the display data or the information.

Figure 19:
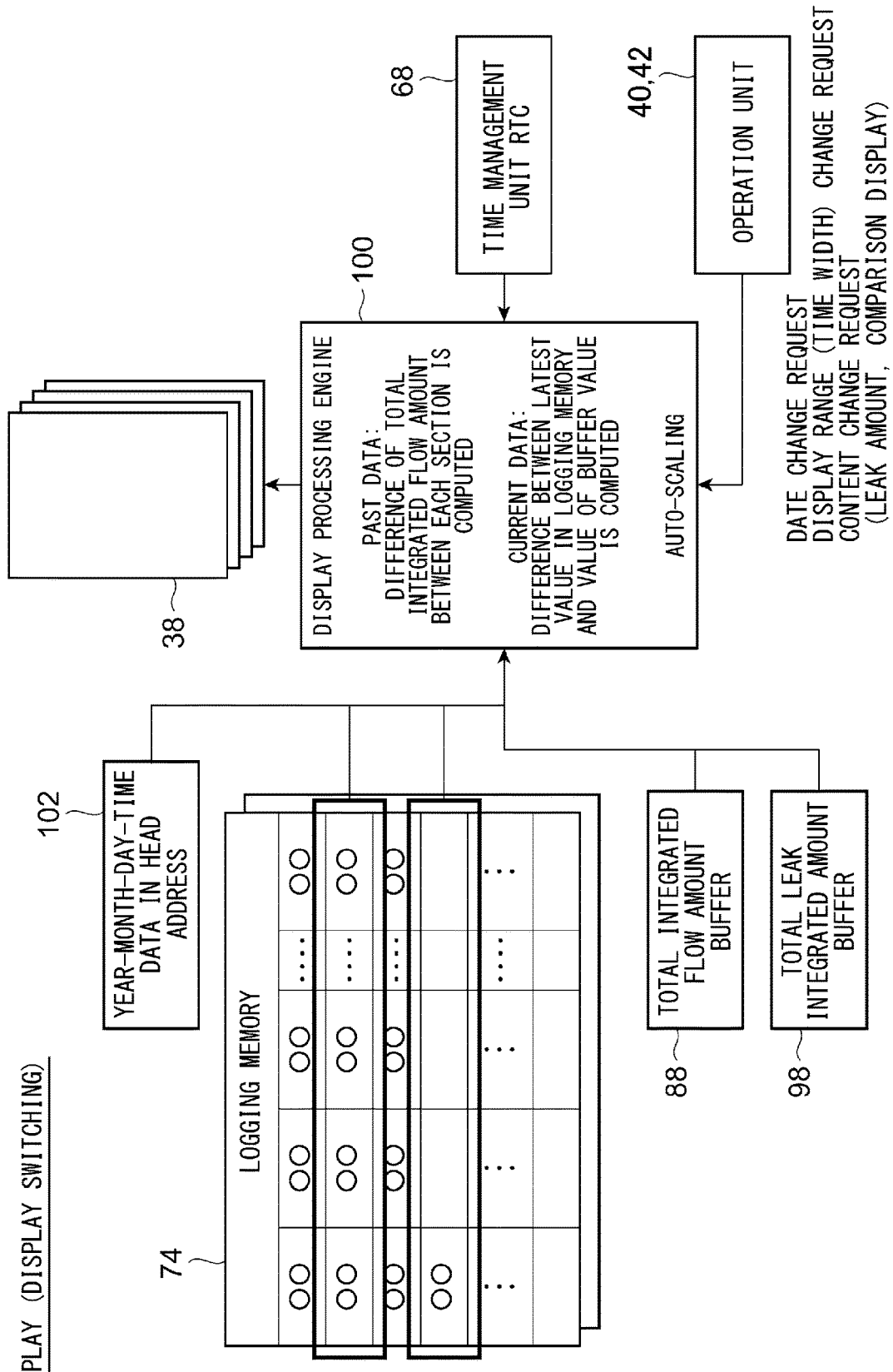
FIG. 19 is a diagram for explaining display switching.

The different display screens having been exemplarily explained with reference to from FIG. 14 to FIG. 18 can be switched by the selection of the user. This display switching will be described with reference to FIG. 19. In FIG. 19, the same elements having been explained with reference to FIG. 6 are assigned with the same reference numerals, and explanations thereof are omitted. The display processing engine 100 executes processing of switching the display screen of the color liquid crystal 38 when the user operates the operation units 40 and 42. The logging memory 74 stores therein data in each section in which the head address is in association with the time in the real-time. Therefore, when the display content is changed with the display switching, a difference of the total integrated flow amount between each section is computed as for past data, and a difference between the latest value in the logging memory 74 and the value of the total integrated flow amount buffer 88 (FIG. 5) is computed as for current data, thereby generating display data after the display screen switching, and display the display data.

Note that, with the operation of the operation units 40 and 42 in the display unit 4, without using the external PC, it is possible to easily request the date change, the change in the display range (time width), the change in the display content (leak amount, comparison display). Further, the user can cause necessary information to display on the color liquid crystal 38 of the display unit 4 with the setting by the simple operation of the operation units 40 and 42, and acquire information useful for the management of the use amount, for example.

Figure 20:
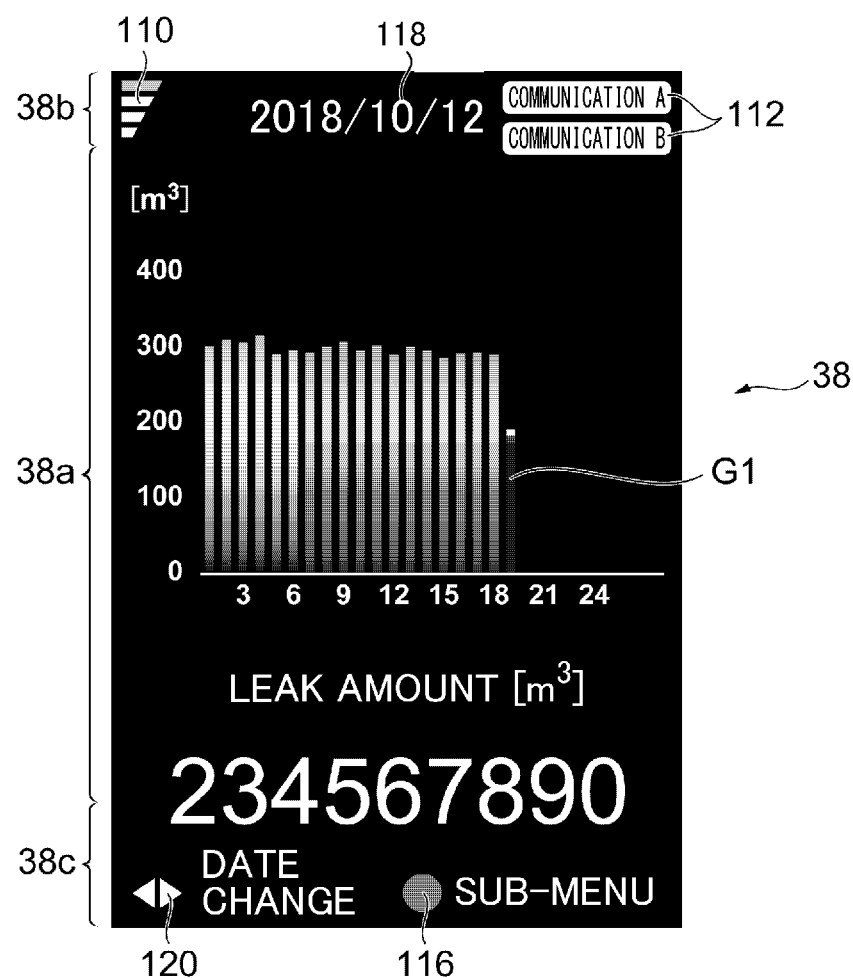
FIG. 20 is a view illustrating a display screen that displays a leak amount with a graph and a numerical value.
Figure 21:
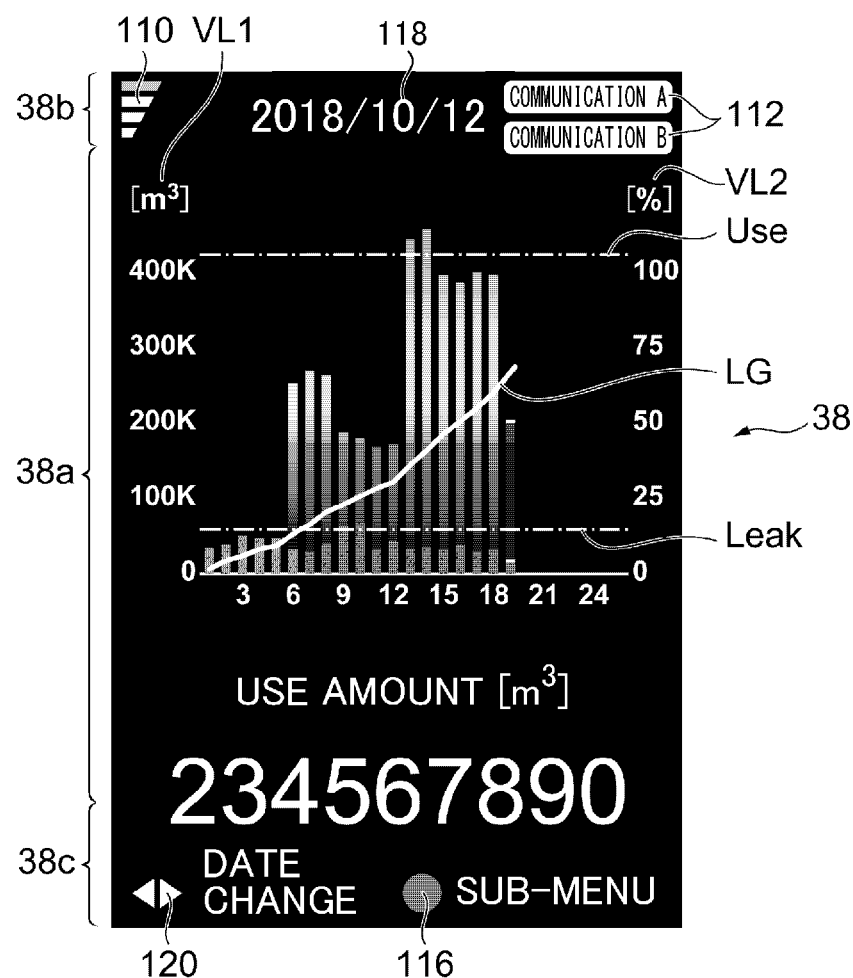
FIG. 21 is a view illustrating a display screen that simultaneously displays a use amount and a leak amount.
Figure 22:
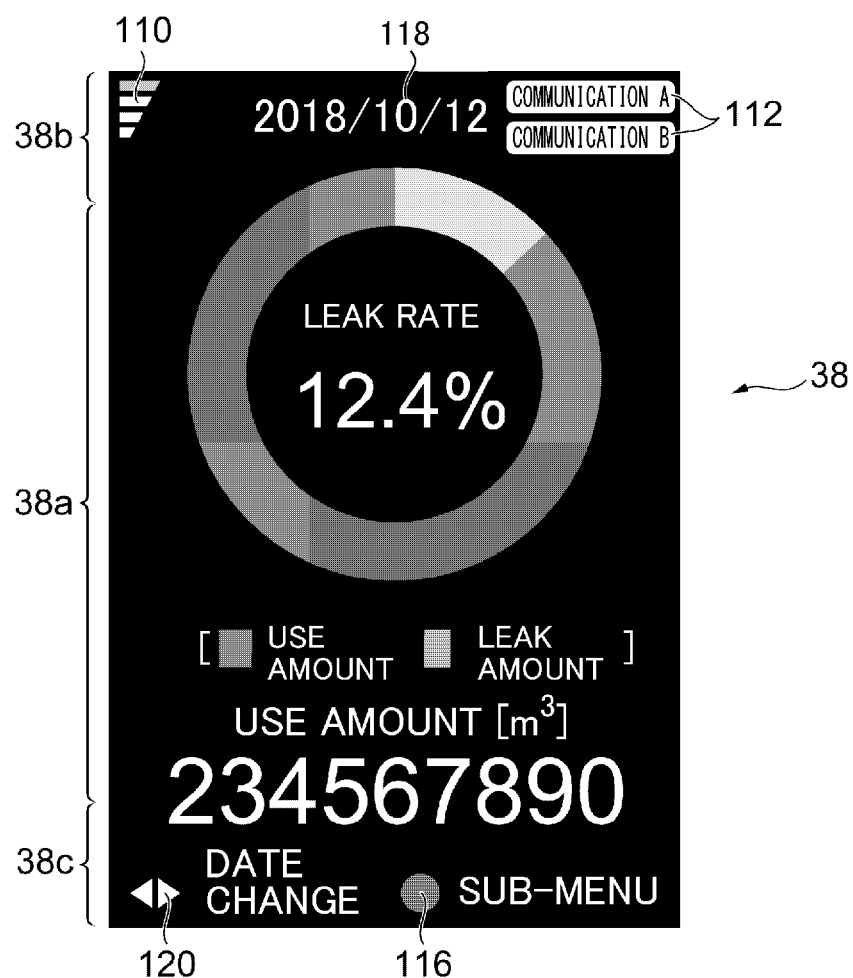
FIG. 22 is a view illustrating a display screen that displays a leak rate.

FIG. 20 to FIG. 22 each illustrate a display example of a display screen related to the leak amount display. In the display screen illustrated in FIG. 20, the leak amount is displayed as a graph and a numerical value. Specifically, a leak integrated amount for every day-and-time section (in the illustrated example, for every hour) is bar-graphically displayed, and a total leak integrated amount in the display range is numerically displayed.

The display processing engine 100 (FIG. 5) generates a display screen in which a leak integrated amount to be determined on the basis of the total leak integrated amount held in the total leak integrated amount buffer 98 and the latest total leak integrated amount in the total leak integrated amount in association with the time stored in the logging memory 74, is graphically displayed at a position of the corresponding day-and-time section.

The total leak integrated amount held in the total leak integrated amount buffer 98 (FIG. 5) is updated from time to time and from moment to moment, and the display processing engine 100 generates a display screen in which a leak integrated amount is graphically displayed at a position of the corresponding day-and-time section, on the basis of the updated total leak integrated amount. The total leak integrated amount and the display screen are updated, so that a bar graph G1 (FIG. 20) of the leak integrated amount to be displayed in the current day-and-time section is extended from time to time and from moment to moment in accordance with the update.

Moreover, the display processing engine 100 generates a display screen in which a leak integrated amount in each day-and-time section to be determined on the basis of each total leak integrated amount in each day-and-time section corresponding to the display range, in the total leak integrated amount in association with the time stored in the logging memory 74, is bar-graphically displayed at a position of the corresponding day-and-time section of the display graph in FIG. 20, for example. As a result, each leak integrated amount corresponding to the past each day-and-time section and the leak integrated amount corresponding to the current day-and-time section are simultaneously displayed with high regularity.

The graph is displayed using the day-and-time section with high periodicity and high regularity, so that a comparison with the past state becomes easy. Accordingly, even if an accurate value of the leak integrated amount in a normal state has not been grasped, a quantitative comparison with the state of the past history becomes easy, and thus the management of gas such as the compression air becomes easy, for example.

In the footer display region 38c, the icon 120 for date change is displayed. The icon 120 includes a pair of triangles directing left and right, and the left-right button in the up-down-left-right button 42a of the operation button 42 indicated by the icon 120 having the pair of triangles is operated to allow the date in the display range (period range) to be changed. For example, when the date is changed to the previous day "2018/10/11", in all the period from 0:00-0:59 to 23:00-23:59 (from 0:00 to 24:00), the past state (history of the use amount) is displayed.

In other words, the display processing engine 100 generates a display screen in which a leak integrated amount in each day-and-time section to be determined on the basis of each total leak integrated amount in each day-and-time section corresponding to a display range (period range) specified via the operation button 42, in the total leak integrated amount in association with the time stored in the logging memory 74, is graphically displayed at a position of the corresponding day-and-time section of the display graph.

To set this display range (period range), in other words, to set the time width, the menu button 40 is operated in accordance with the icon 116 of a sub-menu displayed in the footer display region 38c to select the sub-menu, and the setting can be made from the displayed sub-menu. This setting change can be made during the flow rate measurement being operated, and the setting change of the display range is immediately reflected to the graph display the leak integrated amount. In the sub-menu, for example, selection choices of "day", "month", and "year" are displayed, and the user may be caused to select one from the three selection choices.

FIG. 21 illustrates a display screen that simultaneously displays the use amount in the display range, and the use amount and the leak integrated amount corresponding to each day-and-time section (in the illustrated example, for every continuous one hour). The total use amount in the display range is numerically displayed in a lower portion of the main display region 38a. The use amount corresponded to each day-and-time section is classified by color and displayed as one bar graph corresponding to each day-and-time section and including a leak integrated amount for every continuous one hour, in an upper portion of the main display region 38a. A numerical value of the use amount in the display range is displayed in the upper portion of the main display region 38a, indicates a use amount (flow amount integrated from 0:00 to the relevant time) in a time width from the start of the display range to the relevant time, and corresponds to the use amount corresponding to each day-and-time section being integrated, and the transition of the use amounts is displayed as a line graph LG.

The leak integrated amount that is superimposed and displayed with the use amount corresponding to each day-and-time section is an integrated value of the leak flow amount in each day-and-time section, and is displayed as a bar graph. In the graph display, the leak integrated amount and the use amount are displayed by being aligned with the common graph axis, and are preferably displayed in different colors. In other words, the superimposed display of the use amount and the leak integrated amount is configured so as to have the common display range, and the common first longitudinal axis at one end of the display range.

As mentioned as the above, the display processing engine 100 generates a display screen in which a use amount to be determined on the basis of the latest total integrated flow amount, in the total integrated flow amount held in the total integrated flow amount buffer 88 and the total integrated flow amount in association with the time stored in the logging memory 74, is graphically displayed at a position of the corresponding day-and-time section, and leak integrated amount to be determined on the basis of the total leak integrated amount held in the total leak integrated amount buffer 98 and the latest total leak integrated amount in the total leak integrated amount in association with the time stored in the logging memory 74, is graphically displayed at a position of the corresponding day-and-time section.

The total integrated flow amount held in the total integrated flow amount buffer 88 and the total leak integrated amount held in the total leak integrated amount buffer 98 are updated from time to time and from moment to moment, and the display processing engine 100 generates a display screen in which the integrated flow amount and the leak integrated amount are graphically displayed at a position of the corresponding day-and-time section on the basis of the updated total integrated flow amount and total leak integrated amount. The total integrated flow amount, the total leak integrated amount, and the display screen are updated, so that the bar graph of the use amount and the leak integrated amount displayed in the current day-and-time section is extended from time to time and from moment to moment in accordance with the update.

Moreover, the display processing engine 100 generates a display screen in which the use amount in each day-and-time section to be determined on the basis of each total integrated flow amount of each day-and-time section corresponding to the display range, in the total integrated flow amount in association with the time stored in the logging memory 74, is graphically displayed at a position of the corresponding day-and-time section, and a leak integrated amount in each day-and-time section to be determined on the basis of each total leak integrated amount in each day-and-time section corresponding to the display range, in the total leak integrated amount in association with the time stored in the logging memory 74, is graphically displayed at a position of the corresponding day-and-time section. As a result, the use amount and each leak integrated amount corresponding to the past each day-and-time section, and the use amount and the leak integrated amount corresponding to the current day-and-time section are simultaneously displayed with high regularity.

The use amount in the display range to be displayed by the line graph LG (FIG. 21) is displayed as the percentage when a use amount serving as a target, which is set in advance by the user, is set as 100, and is configured to have a first longitudinal axis VL1 (unit: $m^3$) at one end and a second longitudinal axis VL2 (unit: %) at the other end, which have different units. A use amount serving as a target is preferably displayed, and in this case, the target use amount may be displayed by a transverse dashed line, for example. As for the use amount and the leak integrated amount in each day-and-time section, which are displayed as a bar graph, similarly, target values of the use amount and the leak integrated amount may be displayed as transverse dashed lines. In FIG. 21, "Use" indicates the target value of the use amount, and "Leak" indicates the target value of the leak integrated amount.

The use amount in the display range and the use amount and the leak integrated amount in each day-and-time section are referred to the two longitudinal axes VL1 and VL2 having different units. However, simultaneously displaying target values that refer to the different longitudinal axes may make it difficult to grasp which longitudinal axis is referred at a glance. Therefore, the target use amount relative to the use amount in the display range that is displayed as the percentage is displayed as 100 in the second longitudinal axis VL2 as an alternative, and the color of the line in the line graph LG indicating the use amount in the display range may be differed between above and below the target use amount Use as a boundary, depending on whether the target use amount is exceeded. The different colors may be used for the use amount and the leak integrated amount in each day-and-time section and the display of each target value.

The use amount to be numerically displayed in the lower portion of the main display region 38*a* may be the total use amount (flow amount integrated from 0:00 to the current time) in the display range. In other words, the total amount of each use amount in the use amount graph that is displayed above is numerically displayed.

The screen display in FIG. 22 indicates a leak rate. The leak rate means a ratio of the leak amount in the display range relative to the use amount or the integrated flow amount. This leak rate is numerically displayed, and the ratio of the use amount and the leak amount is preferably displayed in an annular shape.

The calculation of a leak amount by the leak amount processing engine 92 (FIG. 5) can be obtained by the following method. In other words, a flow rate is measured, a fluid non-use period and a fluid use period are distinguished on the basis of the measured flow rate, and on the basis of the flow rate in the fluid non-use period, a leak amount in the fluid non-use period is determined. The leak amount processing engine 92 sends the determined leak amount to the leak amount buffer 94, and updates the leak amount to be held in the leak amount buffer 94. The leak amount processing engine 92 distinguishes a fluid non-use period and a fluid use period on the basis of the measured flow rate, and does not update the leak amount to be held in the leak amount buffer 94 when having determined as the fluid use period.

Accordingly, the leak integrated amount processing engine 96 (FIG. 5) obtains a leak integrated amount in the fluid non-use period on the basis of the leak amount to be successively updated, and obtains a leak integrated amount in the fluid use period on the basis of the leak amount in the fluid non-use period immediately prior to the fluid use period. In other words, the leak integrated amount processing engine 96 estimates a leak amount on the basis of the past flow rate in the fluid non-use period, and calculates a leak integrated amount on the basis of the determined leak amount in the fluid non-use period, the estimated leak amount in the fluid use period, and respective elapsed time. The leak integrated amount processing engine 96 sends the calculated leak integrated amount to the total leak integrated amount buffer 98, and updates a total leak integrated amount to be held in the total leak integrated amount buffer 98.

The leak amount processing engine 92 can set a first threshold for distinguishing the fluid non-use period and the fluid use period, and can distinguish the fluid non-use period and the fluid use period on the basis of the measured flow rate and the first threshold. Moreover, the leak amount processing engine 92 may issue a warning when the leak amount has increased unusually, and may set a second threshold for distinguishing that the leak amount has been generated to the extent to issue a warning.

In the display screen having been explained with reference to FIG. 20, it is preferable to simultaneously display the leak integrated amount in the display range, and the sum of money when the leak integrated amount is converted into a cost. In other words, in a case of the leak of compression air, an expense to be payed for the driving power of the compressor necessary for generating the compression air of the total leak integrated amount may be displayed simultaneously with the total leak integrated amount. The total leak integrated amount is displayed by being converted into the cost to enable the user to realize an economical loss with reality, so that the user will hurry to take measures against the leak.

As for the determination of the leak amount, for example, when all the devices that use the compression air in the factory as a drive source are stopped, if the compression air is flowing through the pipe P at that time, the flow can be estimated due to the leak. However, the period when all the devices can be intentionally stopped is limitedly ensured in the middle of the night or on a holiday, for example, so that the detection and the estimation of the leak amount is not necessarily easy.

Figure 23:
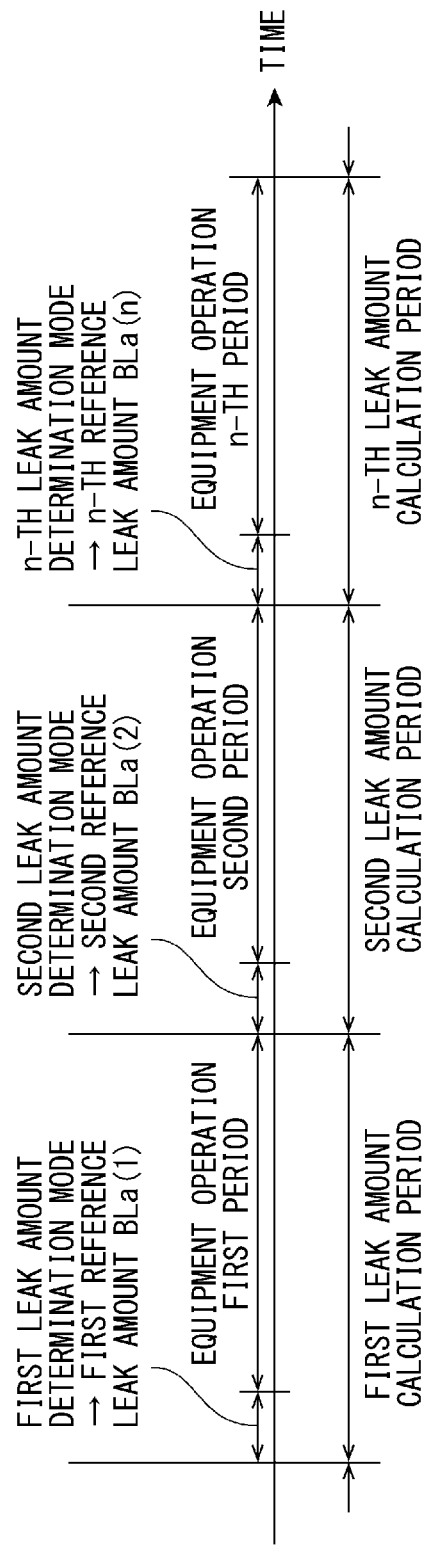
FIG. 23 is a time chart illustrating steps of determining a reference leak amount on the basis of a measured flow rate, and obtaining a leak amount including the time when the equipment is being operated.

FIG. 23 is a time chart in which when the leak amount processing engine 92 determines a leak amount serving as a reference when the constant condition is established, and on the basis of this determined leak amount, the leak integrated amount processing engine 96 calculates a total leak integrated amount in a period including the period when the equipment is operated. An overview will be described with reference to FIG. 23, when the constant condition is established, a leak amount determination mode is started. As the constant condition, a threshold with which the factory equipment is considered to be in a nonoperating state is set. This leak amount determination mode is continued until the factory equipment is operated next, in other words, until the constant condition is not established. A second condition for distinguishing that the factory equipment has operated may be set, and the leak amount processing engine 92 may distinguish that the factory equipment has operated on the basis of the second condition. The leak amount obtained in the leak amount determination mode is used for the calculation of the leak integrated amount during the leak amount determination mode period and the operation period of the factory equipment immediately after that. Preferably, the leak integrated amount is obtained for every day-and-time section described above, and the leak integrated amount for every section is displayed. As a leak amount during the operation period of the factory equipment, a leak integrated amount that corresponds to the abovementioned leak amount may be obtained, or a leak integrated amount may be obtained by detecting an internal pressure in the pipe P during the operation period of the factory equipment, and using the value corrected based on this internal pressure.

As a modification example, the leak amount processing engine 92 determines that, as for the determination of the leak amount, when the measured flow rate is less than a leak threshold, the compression air is in status of not being used, in other words, the factory equipment becomes in a nonoperating state, obtains an average value during a period (non-use period) when the measured flow rate is less than a leak threshold, for example, for every prescribed period, for example, for every 90 seconds, successively updates this average value as a leak amount, and from the time when the measured flow rate is more than a leak threshold and to the time when it is less than the leak threshold next, it can be considered that the lastly updated leak amount may be generated. Also in this case, on the basis of the leak amount obtained during the non-use period having been distinguished on the basis of the leak threshold, a leak integrated amount during this non-use period and a leak integrated amount for every day-and-time section during the operation period of the factory equipment after the non-use period has been moved to the use period are obtained, and these leak integrated amounts for every section are used to the calculation of a leak amount to be displayed. Preferably, the leak integrated amount is obtained for every day-and-time section described above, and the leak integrated amount for every section is displayed. Also in this modification example, when the leak amount to be successively updated is more than a prescribed abnormality threshold during the non-use period, assuming that some sort of abnormality occurs, a warning may be output.

In addition to the abovementioned leak amount determination that is automatically performed, a second leak amount determination mode in which the leak amount is determined on the basis of a timing input from the outside may be included. During the second leak amount determination mode, the leak amount processing engine 92 suspends the automatic update of the leak amount by the fluid non-use period and the fluid use period being distinguished based on the measured flow rate. During the second leak amount determination mode, the leak amount processing engine 92, on the basis of the timing input from the outside, for example, a trigger signal (Tr in FIG. 5) from an external apparatus and a mode change instruction from the user via the operation unit, sends the flow rate acquired from the instantaneous flow rate buffer 82 when this timing input from the outside has been made, as a leak amount, to the leak amount buffer 94, and updates the leak amount to be held in the leak amount buffer 94. When the second leak amount determination mode is ended, the leak amount processing engine 92 executes the automatic update of the leak amount by the fluid non-use period and the fluid use period being distinguished based on the measured flow rate.

The above-mentioned leak amount determination mode will be further specifically described with reference to FIG. 23, and on the basis of the measured flow rate and a threshold, when the measured flow rate is less than the threshold, becomes the first leak amount determination mode. When the measured flow rate is more than the threshold, the first leak amount determination mode is cancelled. During the first leak amount determination mode period, the flow rate is successively measured, and an average value thereof is determined as a first leak amount BLa(1). A leak amount in a first leak amount calculation period including an equipment operation first period after the first leak amount determination mode has been canceled and during the first leak amount determination mode period is calculated on the basis of the first leak amount BLa(1). Thereafter, this processing is repetitively executed.

When the measured flow rate unusually increases during the leak amount determination mode, in other words, when the measured flow rate is exceeded the abnormality detect threshold, a warning may be output.

Figure 24:
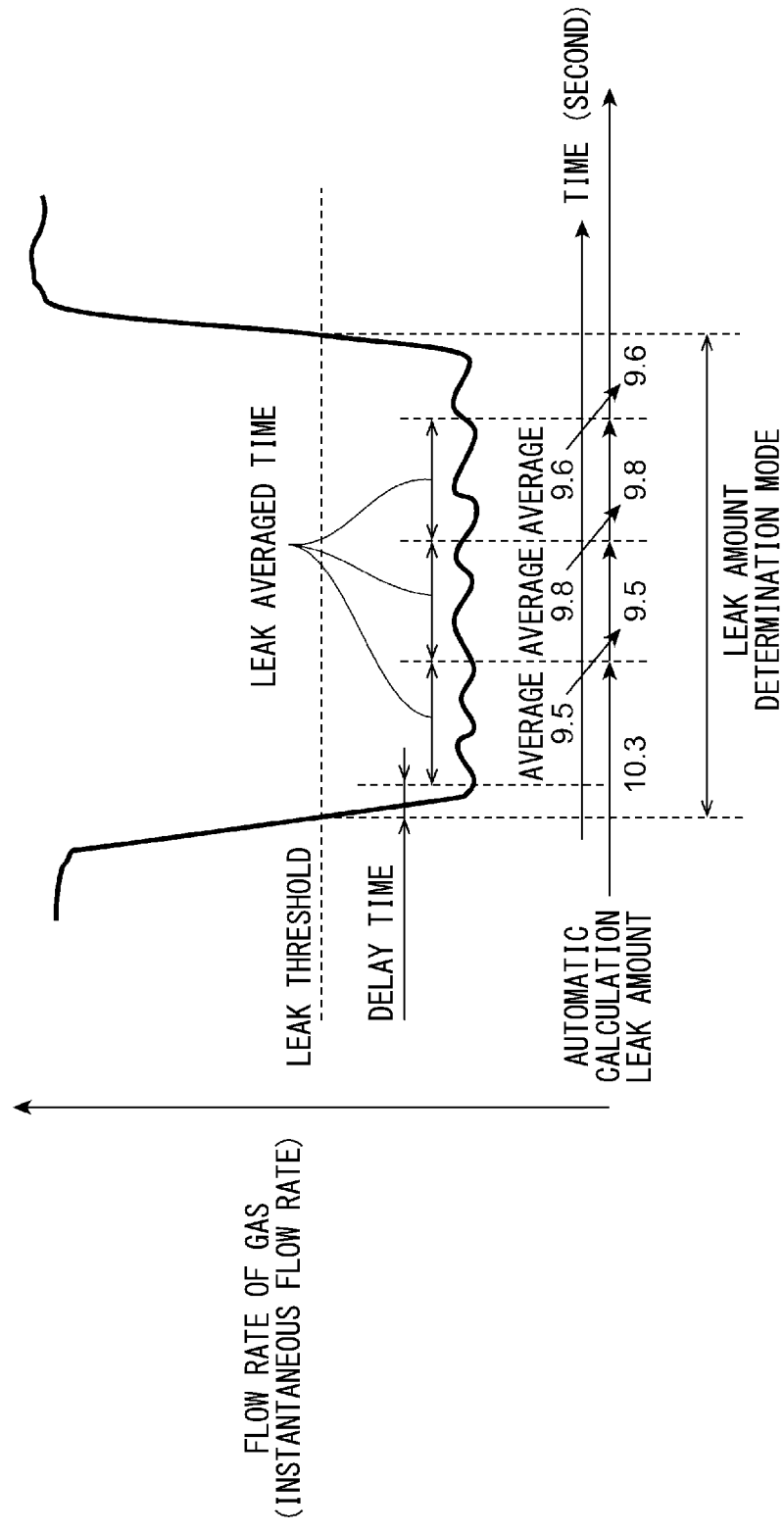
FIG. 24 is a conceptual diagram of processing in a leak amount determination mode in which a reference leak amount is determined.

With reference to FIG. 24, processing in the leak amount determination mode will be described. When the compression air is used under the normal operation, the flow rate is certainly more than the abovementioned threshold. Therefore, a value less than the flow rate of the compression air under the normal operation is considered to be a leak is set as a threshold. With this leak threshold, regardless of the period when the factory equipment is operating or a nonoperation period, it is possible to distinguish, on the basis of the measured flow rate, whether the compression air is used, in other words, whether the factory equipment is operating.

When the measurement flow rate is less than a leak threshold, it is determined that a state where the compression air is not used at all starts, and the leak amount determination mode is started. In the leak amount determination mode, a plurality of flow rate values continuously measured in the stage where the leak detection delay time or more is elapsed and the flow rate becomes stable, are averaged, and the average value is determined as a leak flow rate BLa.

Preferably, an averaging period is set in advance, a first average value ("9.5" illustrated in FIG. 24) in a first averaged time is stored in a memory, and the first average value in the memory is updated with a second average value ("9.8" illustrated in FIG. 24) in the second averaged time. Next, the second average value in the memory is updated with a third average value ("9.6" illustrated in FIG. 24) in a third averaged time. The first to third average values in the first to third periods of the respective time sections can be used for making them as a graph. When the leak amount determination mode is finished, the average value having been continuously updated during the leak amount determination mode is set as a leak flow rate BLa(n). Continuously updating the leak flow rate BLa(n) in time series allows the most possible leak amount included in the compression air use amount under the on-site operation to be obtained. As the leak amount during the operation, a value in which the reference leak flow rate BLa(n) is corrected with the pipe internal pressure and the environment temperature may be employed.

Moreover, preferably, a value of the leak threshold may be updated on the basis of the leak flow rate BLa(n), and the leak threshold may be optimized. In other words, when the reference leak flow rate BLa(n) changes more than a predetermined value, the threshold change may be instructed, and when this instruction is accepted, the threshold stored in the memory may be updated to change the threshold.

Figure 25:
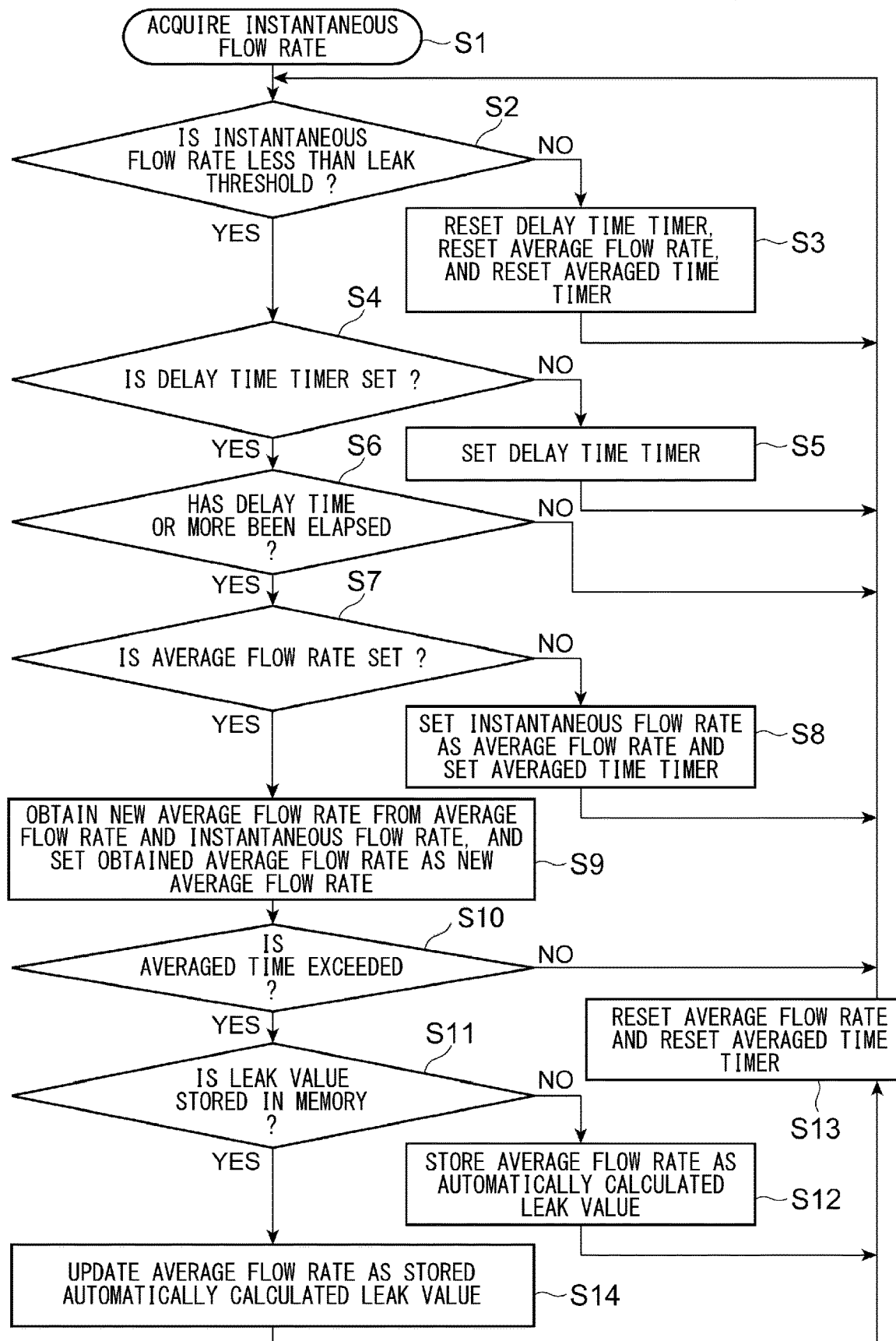
FIG. 25 is a flowchart for explaining a procedure of obtaining a reference leak amount.

The further specific explanation is made on the basis of the flowchart in FIG. 25. At Step S1, an instantaneous flow rate, in other words, a current flow rate is acquired. At next Step S2, a determination is made whether this instantaneous flow rate is less than a leak threshold, and if NO (instantaneous flow rate is plenty), the processing is proceeded to Step S3, and the delay time timer, the average flow rate, and the averaged time timer are reset. If YES at Step S2, the instantaneous flow rate is a little, the processing is proceeded to Step S4, and a determination is made whether the delay time timer is set. The set time of the delay time timer is one minute, as an example. If NO at Step S4, the processing is proceeded to Step S5, and the delay time timer is set. At Step S4, if the delay time timer is set, the processing is proceeded to Step S6, and a determination is made whether the delay time has been elapsed, if the delay time has been elapsed, the value of the instantaneous flow rate is settled, the processing is proceeded to Step S7.

At Step S7, a determination is made whether the average flow rate is set, If NO, the processing is proceeded to Step S8, and the instantaneous flow rate is set as an average flow rate and an averaged time timer is set. The set time of the averaged time timer is one minute, as an example. At Step S7, if YES, in other words, if the average flow rate is set, the processing is proceeded to Step S9, an average flow rate is newly obtained from the average flow rate and the instantaneous flow rate, this obtained average flow rate is set as a new average flow rate. At next Step S10, a determination is made whether the averaged time is exceeded: if YES, the sufficient averaging has been executed, the processing is proceeded to Step S11, and a determination is made whether the leak value is stored; and If NO, the processing is proceeded to Step S12, and the leak value is stored in the memory. On the other hand, if YES, the processing is proceeded to Step S14, and the average flow rate is updated as a stored leak value, and subsequently, at Step S13, the average flow rate is reset and the averaged time timer is reset.

With the abovementioned processing, when the flow rate is stable at a slight value, an average value thereof is regarded as a leak value, and is successively updated, so that for example, in the middle of the night, a possible leak value can be automatically obtained. Further, the leak value obtained in this manner may be used in the above-mentioned screen display.

When the most possible leak value is obtained in the abovementioned procedure in the leak amount determination mode, chattering is made in the vicinity of the leak threshold, the calculation of the automatic calculation leak flow amount is not executed. Moreover, when the flow rate instantaneously exceeding the leak threshold during the detection of a leak value, the calculation is performed again from the delay time, so that the instantaneous variation in the flow rate does not become a disturbance element. If the power failure occurs or the power supply is cut off, for example, during the execution of leak amount determination mode, the average value automatically calculated immediately prior, in other words, the leak flow rate is stored in the memory, so that it is possible to consider that the leak flow rate in this memory continues. Note that, in place of the average value of the leak values, a median value of the maximum value and the minimum value may be employed.

In the foregoing, the preferable embodiment in which the present invention is applied to the clamp-on type ultrasonic flow meter has been explained, however, the present invention is not limited thereto. For example, as the gas flow meter, a thermal flow meter and a vortex flow meter have been known. The present invention can be also suitably applied to these gas flow meters.

What is claimed is:

1. A gas flow meter comprising:
   a flow rate measurement unit configured to measure a flow rate of gas in a pipe;
   a real-time clock configured to hold current time data, and update the current time data corresponding to a current time;
   a calculation unit configured to calculate integrated flow amount data from the flow rate measured by the flow rate measurement unit;
   a storage unit configured to store therein day-and-time information based on the current day-and-time data of the real-time clock in association with the calculated integrated flow amount data; and
   a screen generation unit configured to generate an integrated flow amount graph screen that includes a plurality of day-and-time sections that are temporally continued, graphically displays, in the past day-and-time sections in the plurality of the day-and-time sections, based on the day-and-time information and the integrated flow amount data stored in the storage unit, an integrated flow amount corresponding to each day-and-time section in the past day-and-time sections, and successively updates and graphically displays, in the day-and-time section including a current day-and-time in the plurality of the day-and-time sections, based on the integrated flow amount data successively calculated by the calculation unit, an integrated flow amount from a start of the day-and-time section to the current time.

2. The gas flow meter according to claim 1, further comprising an operation unit configured to be operable by a user, wherein even when flow rate measurement is being operated, the user operates the operation unit to allow a display range including the plurality of the day-and-time sections to be changed, and for each of the day-and-time sections, integrated flow amount data in the day-and-time section after the change is calculated from history data, the calculated integrated flow amount data is graphically displayed in a display portion corresponding to each day-and-time section, and current integrated flow amount data from the day-and-time section start to the current time is graphically displayed in a portion corresponding to a day-and-time section after the change including the current time.

3. The gas flow meter according to claim 1, wherein a first display range including a day-and-time section including the current time, and one or a plurality of past day-and-time sections continuous to the day-and-time section, and a second display range including a plurality of continuous day-and-time sections and being past from the first display range, are switchable during the flow rate measurement being operated, and integrated flow amount data corresponding to each day-and-time section is displayed after the switching of the display range.

4. The gas flow meter according to claim 3, wherein when a period with no operation by the user is continued for a certain period after the second display range is displayed, the display is switched to the display in the first display range.

5. The gas flow meter according to claim 4, wherein an integrated flow amount graph corresponding to the first display range, an integrated flow amount graph corresponding to the second display range are displayed by comparison at display positions in the display range being aligned.

6. The gas flow meter according to claim 5, wherein a third display range including a plurality of continuous day-and-time sections and being past from the second display range, and the second display range are switchable by the operation of the user, and after the switching of the display range, the integrated flow amount graph corresponding to the first display range and an integrated flow amount graph corresponding to the third display range are displayed by comparison at display positions in the display range being aligned.

7. The gas flow meter according to claim 1, wherein a total integrated flow amount of the integrated flow amount data is stored in the storage unit in association with time information of the real-time clock.

8. The gas flow meter according to claim 1, wherein one from a group including day, month, and year is selectable, as the display range.

9. The gas flow meter according to claim 1, wherein the graph display and a numerical value display can be switched and displayed.

10. The gas flow meter according to claim 9, wherein the numerical value display and the graph display of an instantaneous flow rate are simultaneously displayed.

11. The gas flow meter according to claim 1, wherein when a threshold with respect to the integrated flow amount in the day-and-time section is set, the threshold is further displayed.

12. The gas flow meter according to claim 1, wherein in the graph display of the integrated flow amount in the integrated flow amount graph screen generated by the screen generation unit, two axes having different units are displayed in the integrated flow amount graph screen, and the threshold is further displayed in the integrated flow amount graph screen.

13. The gas flow meter according to claim 1, wherein a flow amount in a plus direction and a flow amount in a minus direction are simultaneously displayed in the integrated flow amount graph screen generated by the screen generation unit.

14. A gas flow meter comprising:

a flow rate measurement unit configured to measure a flow rate of gas in a pipe;

a real-time clock configured to hold current time data, and update the current time data corresponding to a current time;

a calculation unit configured to calculate integrated flow amount data from the flow rate measured by the flow rate measurement unit;

a storage unit configured to store therein, by corresponding to temporally continued day-and-time sections, day-and-time information based on the current day-and-time data of the real-time clock in association with the calculated integrated flow amount data; and a data process unit configured to provide, in order to generate a display screen on which an integrated flow amount in each day-and-time section is displayed, by corresponding to an integrated flow amount in a past day-and-time section, the day-and-time information and the integrated flow amount data stored in the storage unit, and provide, by corresponding to an integrated flow amount in a day-and-time section including a current day-and-time, current integrated flow amount data to be successively calculated by the calculation unit.

* * * * *